United States Patent
Ando

(10) Patent No.: US 11,706,524 B2
(45) Date of Patent: Jul. 18, 2023

(54) INTERMEDIARY TERMINAL, COMMUNICATION SYSTEM, AND INTERMEDIATION CONTROL METHOD

(71) Applicant: Ricoh Company, Ltd., Tokyo (JP)

(72) Inventor: Mitsuo Ando, Fukuoka (JP)

(73) Assignee: RICOH COMPANY, LTD., Tokyo (JP)

( * ) Notice: Subject to any disclaimer, the term of this patent is extended or adjusted under 35 U.S.C. 154(b) by 302 days.

(21) Appl. No.: 16/797,754

(22) Filed: Feb. 21, 2020

(65) Prior Publication Data

US 2020/0280671 A1    Sep. 3, 2020

(30) Foreign Application Priority Data

Mar. 1, 2019  (JP) .................. 2019-037255

(51) Int. Cl.
  *H04L 67/56*  (2022.01)
  *H04N 23/661*  (2023.01)
  *H04L 67/02*  (2022.01)

(52) U.S. Cl.
  CPC ......... *H04N 23/661* (2023.01); *H04L 67/56* (2022.05); *H04L 67/02* (2013.01)

(58) Field of Classification Search
  CPC ....... H04L 67/02; H04L 67/28; H04L 67/327; H04N 1/00249; H04N 1/32358; H04N 5/23206; H04N 5/76
  See application file for complete search history.

(56) References Cited

U.S. PATENT DOCUMENTS

| 7,912,453 | B2 * | 3/2011 | Coan ...................... | H04W 4/12 |
| | | | | 455/412.2 |
| 2008/0192728 | A1 | 8/2008 | Levesque et al. | |
| 2008/0218498 | A1 * | 9/2008 | Yoshioka ............... | G06F 21/34 |
| | | | | 345/204 |

(Continued)

FOREIGN PATENT DOCUMENTS

| CN | 1492717 A | 4/2004 |
| CN | 1943165 A | 4/2007 |

(Continued)

OTHER PUBLICATIONS

Combined Chinese Office Action and Search Report dated Mar. 29, 2021 in Chinese Patent Application No. 202010119370.2 (with English translation), 14 pages.

(Continued)

*Primary Examiner* — Gil H. Lee
(74) *Attorney, Agent, or Firm* — Xsensus LLP

(57) ABSTRACT

An intermediary terminal for mediating a communication between a data generation device that generates target data, and a server that controls service content usable with the data generation device, includes circuitry configured to acquire, from the data generation device, device identification information identifying the data generation device; transmit the acquired device identification information to the server via a communication network; receive, from the server, service content information indicating a service content associated with the device identification information; and execute processing on the target data input from the data generation device in accordance with the service content indicated by the service content information.

20 Claims, 16 Drawing Sheets

(56) References Cited

U.S. PATENT DOCUMENTS

| | | | |
|---|---|---|---|
| 2010/0205279 A1 | 8/2010 | Takakura | |
| 2012/0084402 A1 | 4/2012 | Ito et al. | |
| 2014/0071482 A1* | 3/2014 | Ishibashi | H04N 1/2166 |
| | | | 358/1.15 |
| 2014/0096007 A1* | 4/2014 | Itoh | G06F 16/50 |
| | | | 715/732 |
| 2014/0185075 A1 | 7/2014 | Ishibashi | |
| 2014/0337405 A1* | 11/2014 | Athas | H04L 67/567 |
| | | | 709/203 |
| 2017/0024515 A1* | 1/2017 | Ebberson | G06F 16/48 |
| 2017/0339232 A1 | 11/2017 | Ando | |
| 2018/0084121 A1 | 3/2018 | Ando | |
| 2018/0176417 A1 | 6/2018 | Ando | |
| 2020/0084291 A1 | 3/2020 | Ando | |

FOREIGN PATENT DOCUMENTS

| | | |
|---|---|---|
| CN | 101808115 A | 8/2010 |
| CN | 102447958 A | 5/2012 |
| CN | 102469015 A | 5/2012 |
| CN | 103916567 A | 7/2014 |
| CN | 110895459 A | 3/2020 |
| EP | 3 624 033 A1 | 3/2020 |
| JP | 2006-174060 | 6/2006 |
| JP | 2012-199887 A | 10/2012 |

OTHER PUBLICATIONS

Extended European Search Report dated Jul. 27, 2020 in corresponding European Patent Application No. 20159665.7, 9 pages.
Japanese Office Action dated Aug. 30, 2022, in corresponding Japanese Patent Application No. 2019-037255, 9 pp.

* cited by examiner

FIG. 6A

| CONTRACT ID | IMAGE CAPTURING DEVICE ID | MAC ADDRESS | USER ID | IP ADDRESS | DEVICE PASSWORD | INTERMEDIARY TERMINAL ID | SERVICE ID | CONNECTION STATE BETWEEN IMAGE CAPTURING DEVICE AND INTERMEDIARY TERMINAL |
|---|---|---|---|---|---|---|---|---|
| A001 | Thet1 | 00:00:01 | ando@··· | 10.56.60.10 (DYNAMIC) | Pwd1 | Eg001-01 (FIXED) | Tag_CmSlide1 Tag_CmRecord | CONNECTED |
|  | Thet2 | 00:00:02 | ando@··· | 10.56.61.12 (FIXED) | Pwd2 | (DYNAMIC) | Tag_CmUpload Tag_CmLive | NOT-CONNECTED |
| A002 | Penta1 | 00:00:03 | saito@··· | 10.56.61.13 (FIXED) | Pwd3 | (DYNAMIC) | Tag_CmUpload | NOT-CONNECTED |

FIG. 6B

| SERVICE ID | INPUT APPLICATION ID (InApplication) | OUTPUT APPLICATION ID (OutApplication) | BROWSER ID |
|---|---|---|---|
| Tag_CmUpload | AP_EgCmUpload | – | – |
| Tag_CmRecord | AP_EgCmRecord | – | – |
| Tag_CmSlide | AP_EgCmUpload | AP_Slide |  |
| Tag_CmSlide1 | AP_EgCmUpload | AP_Slide | KIOSK1 |
| Tag_CmSlide2 | AP_EgCmUpload | AP_Slide | KIOSK2 |
| Tag_CmLive | AP_EgCmLive | AP_Live |  |
| Tag_CmLive1 | AP_EgCmLive | AP_Live | KIOSK1 |
| Tag_CmLive2 | AP_EgCmLive | AP_Live | KIOSK2 |

FIG. 7A

| CONTRACT ID | INTERMEDIARY TERMINAL ID | IP ADDRESS | TERMINAL STATE | BROWSER ID | BROWSER STATE | OUTPUT APPLICATION ID (OutApplication) |
|---|---|---|---|---|---|---|
| A001 | Eg001-01 | 10.56.60.xx | CONNECTED | KIOSK1 | ACTIVATED | AP_Slide |
| | Eg001-02 | 192.168.0.xx | NOT-CONNECTED | KIOSK2 | NOT ACTIVATED | AP_Live |

FIG. 7B

| IMAGE CAPTURING DEVICE ID | RECORDING TIME | | UPLOAD TIME |
|---|---|---|---|
| | START | END | START |
| Thet1 | 9:00 | 12:00 | 21:00 |
| Thet2 | 9:00 | 11:00 | 20:00 |

FIG. 8A

| APPLICATION ID | APPLICATION TYPE | APPLICATION URL | CORRESPONDING BROWSER/ APPARATUS |
|---|---|---|---|
| AP_Slide | Out | https://···.com/photoshow.html, https://···.com/photoshow.js | Browser |
| AP_Live | Out | https://···.com/live.html, https://···.com/live.js | Browser |
| AP_EgCmUpload | In | https://···.com/cm_upload.jnlp | INTERMEDIARY APPARATUS |
| AP_EgCmRecord | In | https://···.com/cm_record.jnlp | INTERMEDIARY APPARATUS |
| AP_EgCmLive | In | https://···.com/cm_live.jnlp | INTERMEDIARY APPARATUS |

FIG. 8B

| CONTRACT ID | USER ID | FILE NAME |
|---|---|---|
| A001 | guest | ···.jpeg |
| | ando@··· | ···.jpeg ···.jpeg |

FIG. 9A

| | IMAGE CAPTURING DEVICE ID | DEVICE PASSWORD | IP ADDRESS | TERMINAL ID | |
|---|---|---|---|---|---|
| | IMAGE CAPTURING DEVICE REGISTRATION | | | ando@··· | |
| 1 | Thet1 | Pwd1 | | Eg001-01 | APPLICATION |
| 2 | Thet1 | Pwd1 | 10.56.61.12 | | APPLICATION |
| 3 | | | | | APPLICATION |

CONFIRM CONNECTION    ENTER

FIG. 9B

SERVICE CONTENT SETTING

☑ UPLOAD SERVICE
    ☑ SLIDE SHOW SERVICE

☑ RECORDING SERVICE
    RECORDING START/END TIME  9:00-12:00
    UPLOAD START TIME  21:00

☐ LIVE DISTRIBUTION SERVICE    RETURN

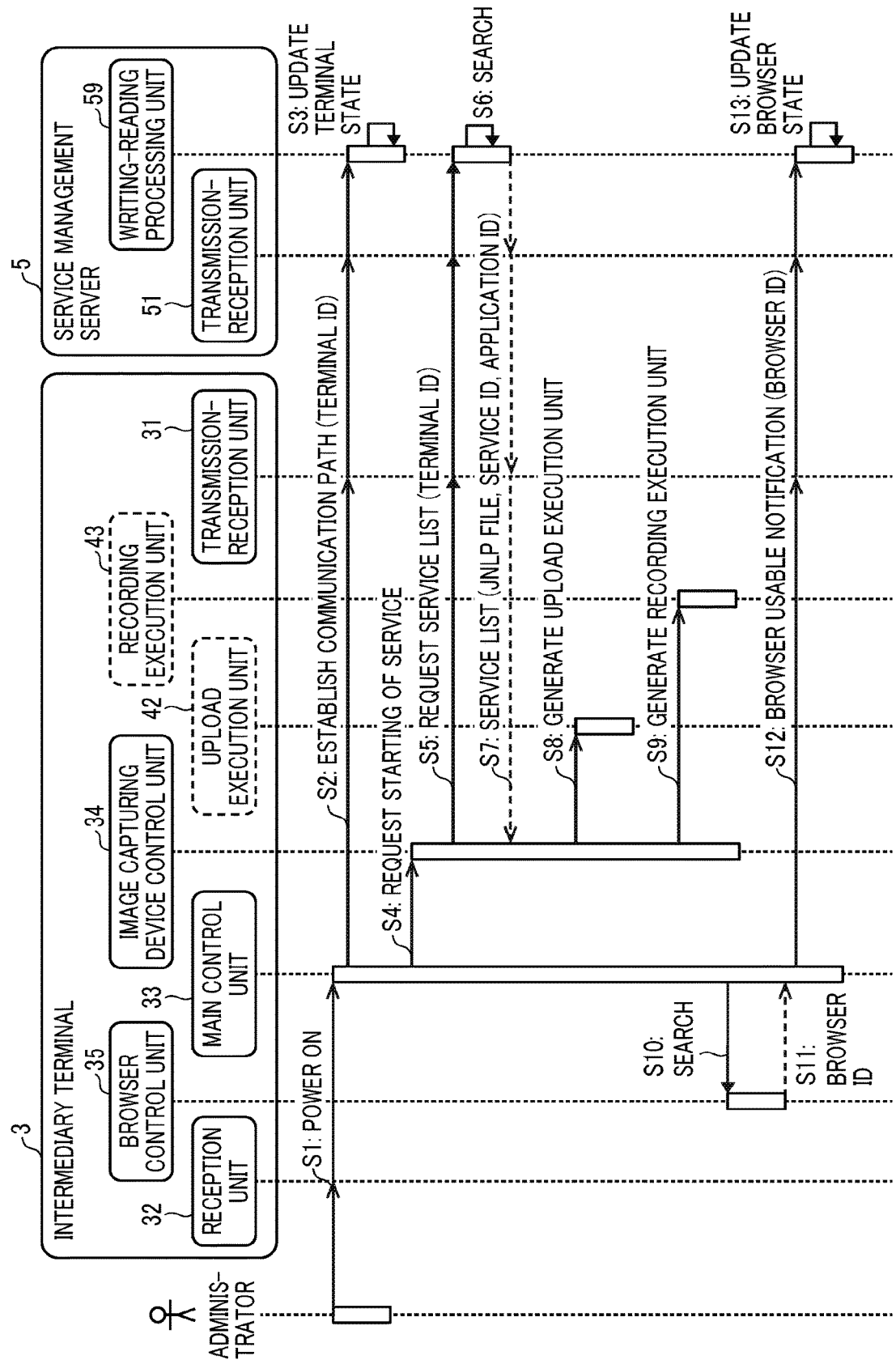

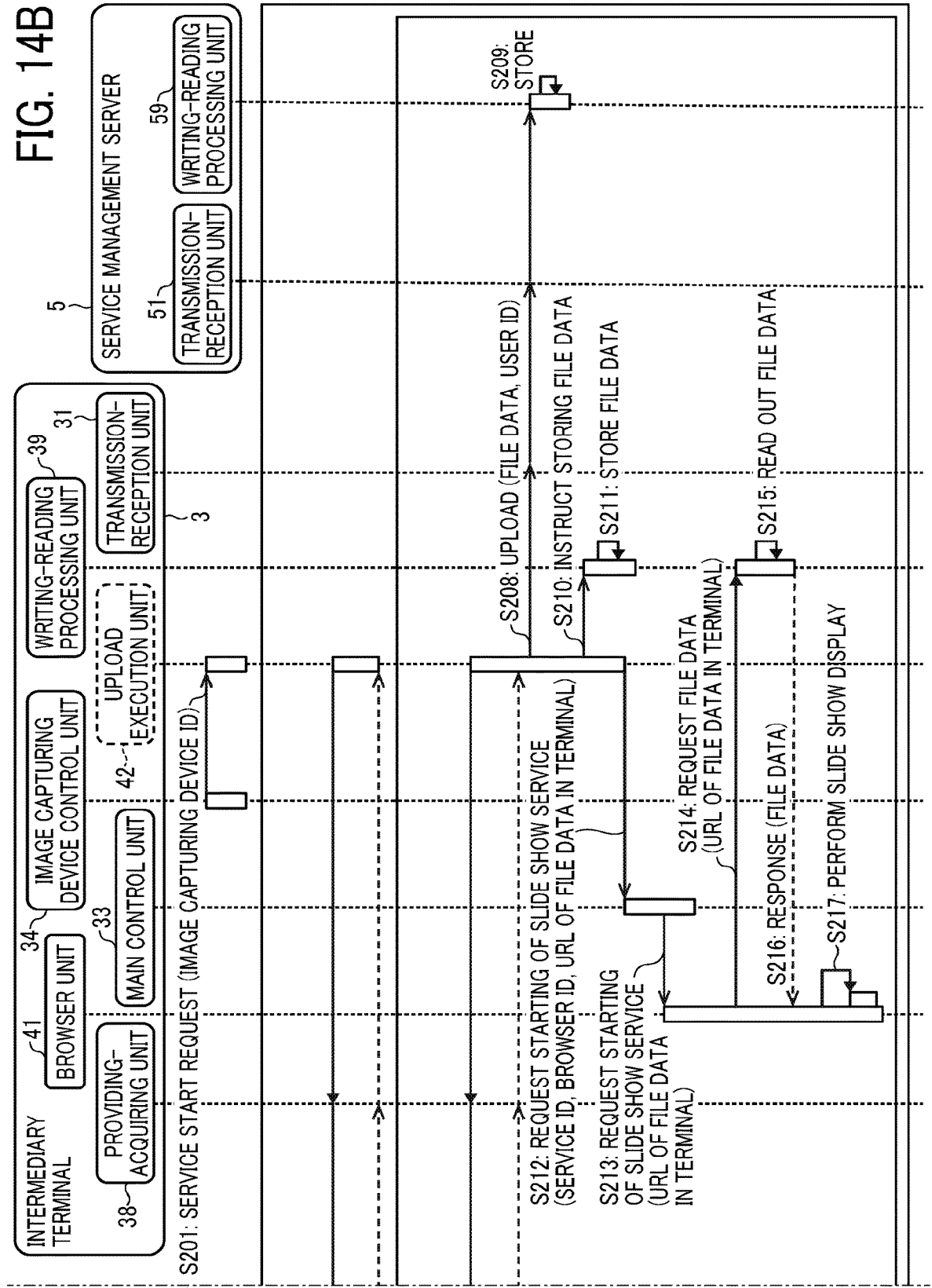

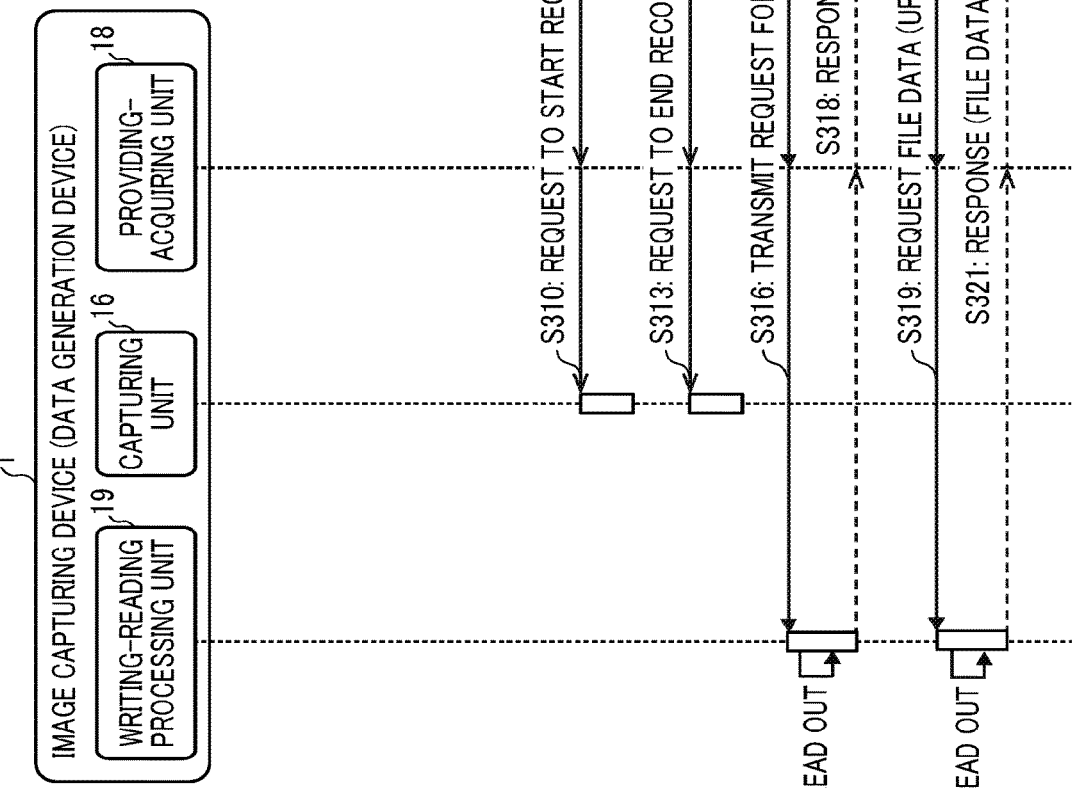

INTERMEDIARY TERMINAL, COMMUNICATION SYSTEM, AND INTERMEDIATION CONTROL METHOD

CROSS-REFERENCE TO RELATED APPLICATION

This application claims priority pursuant to 35 U.S.C. § 119(a) to Japanese Patent Application No. 2019-037255, filed on Mar. 1, 2019 in the Japan Patent Office, the disclosure of which is incorporated by reference herein in its entirety.

BACKGROUND

Technical Field

This disclosure relates to an intermediary terminal, a communication system, and intermediary control method.

Background Art

Image capturing devices (e.g., digital cameras) capture and generate image data, and then store the image data in memories disposed therein. To ensure a given storage capacity level of the memories, when the remaining storage capacity level of the memories becomes scarce, the image capturing devices upload the image data to a server via a communication network, such as the Internet. Further, users of the image capturing devices have various needs, such as changing the time when the image data is uploaded to the server, and displaying the image data on other device, or the like.

However, as to conventional image capturing devices, uploading of image data is performed only when the remaining storage capacity level of the memories becomes scarce (i.e., pre-fixed processing alone is performed), and thereby the users of image capturing devices feel difficulty to use services that are not pre-fixed for image capturing devices (i.e., expandability of service is low).

Further, the image capturing devices can be installed with specific applications to perform specific processing for implementing the contents of specific services. However, users of the image capturing devices have to install the specific applications by themselves, which is not convenient. Further, some specific applications cannot be installed on some image capturing devices by general users, causing the lower expandability of service. The above described issues may also occur when services using data generation devices are provided to users (e.g., when image data generated by the data generation devices is used as target data for performing specific services).

SUMMARY

As one aspect of the present disclosure, an intermediary terminal for mediating a communication between a data generation device that generates target data, and a server that controls service content usable with the data generation device is devised. The intermediary terminal includes circuitry configured to acquire, from the data generation device, device identification information identifying the data generation device; transmit the acquired device identification information to the server via a communication network; receive, from the server, service content information indicating a service content associated with the device identification information; and execute processing on the target data input from the data generation device in accordance with the service content indicated by the service content information.

As another aspect of the present disclosure, a communication system is devised. The communication system includes a server that controls service contents usable with a data generation device that generates target data; and an intermediary terminal that mediates a communication between the data generation device and the server. The server includes circuitry configured to transmit, to the intermediary terminal, service content information indicating a service content associated with device identification information identifying the data generation device received from the intermediary terminal. The intermediary terminal includes another circuitry configured to acquire, from the data generation device, the device identification information identifying the data generation device, transmit the acquired device identification information to the server via a communication network, receive, from the server, the service content information, and execute processing on the target data input from the data generation device in accordance with the service content indicated by the service content information.

As another aspect of the present disclosure, a method of controlling a communication between a data generation device, which generates target data, and a server, which controls service content usable with the data generation device, using an intermediary terminal is devised. The method includes acquiring, from the data generation device, device identification information identifying the data generation device; transmitting the acquired device identification information to the server via a communication network; receiving, from the server, service content information indicating a service content associated with the device identification information; and executing processing on the target data input from the data generation device in accordance with the service content indicated by the service content information.

BRIEF DESCRIPTION OF THE DRAWINGS

A more complete appreciation of the description and many of the attendant advantages and features thereof can be readily acquired and understood from the following detailed description with reference to the accompanying drawings, wherein:

FIG. 6A is a conceptual diagram of an example image capturing device information management table according to an embodiment of this disclosure;

FIG. 6B is a conceptual diagram of an example service management table according to an embodiment of this disclosure;

FIG. 7A is a conceptual diagram of an example intermediary terminal state management table according to an embodiment of this disclosure;

FIG. 7B is a conceptual diagram of an example recording management table according to an embodiment of this disclosure;

FIG. 8A is a conceptual diagram of an example application management table according to an embodiment of this disclosure;

FIG. 8B is a conceptual diagram of an example file management table according to an embodiment of this disclosure;

FIG. 9A is an example of an image capturing device registration screen according to an embodiment of this disclosure;

FIG. 9B is an example of a service content setting screen;

FIGS. 11 and 12 are sequence diagrams illustrating a pre-processing before starting the processing of each service content according to an embodiment of this disclosure;

FIGS. 14A and 14B (FIG. 14) are sequence diagrams illustrating a process of uploading still image file and performing a service of slide show of still image file according to an embodiment of this disclosure; and FIGS. 15A and 15B (FIG. 15) are sequence diagrams illustrating a process of executing a service of recording and uploading according to an embodiment of this disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

A description is now given of exemplary embodiments of the present disclosures. It should be noted that although such terms as first, second, etc., may be used herein to describe various elements, components, regions, layers and/or units, it should be understood that such elements, components, regions, layers and/or units are not limited thereby because such terms are relative, that is, used only to distinguish one element, component, region, layer or unit from another region, layer or unit. Thus, for example, a first element, component, region, layer or unit discussed below could be termed a second element, component, region, layer or unit without departing from the teachings of the present disclosures.

In addition, it should be noted that the terminology used herein is for the purpose of describing particular embodiments only and is not intended to be limiting of the present disclosures. Thus, for example, as used herein, the singular forms "a", "an" and "the" are intended to include the plural forms as well, unless the context clearly indicates otherwise. Moreover, the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

Hereinafter, a description is given of a communication system according to one or more embodiments in detail with reference to the drawings.

(System)

Figure 1:
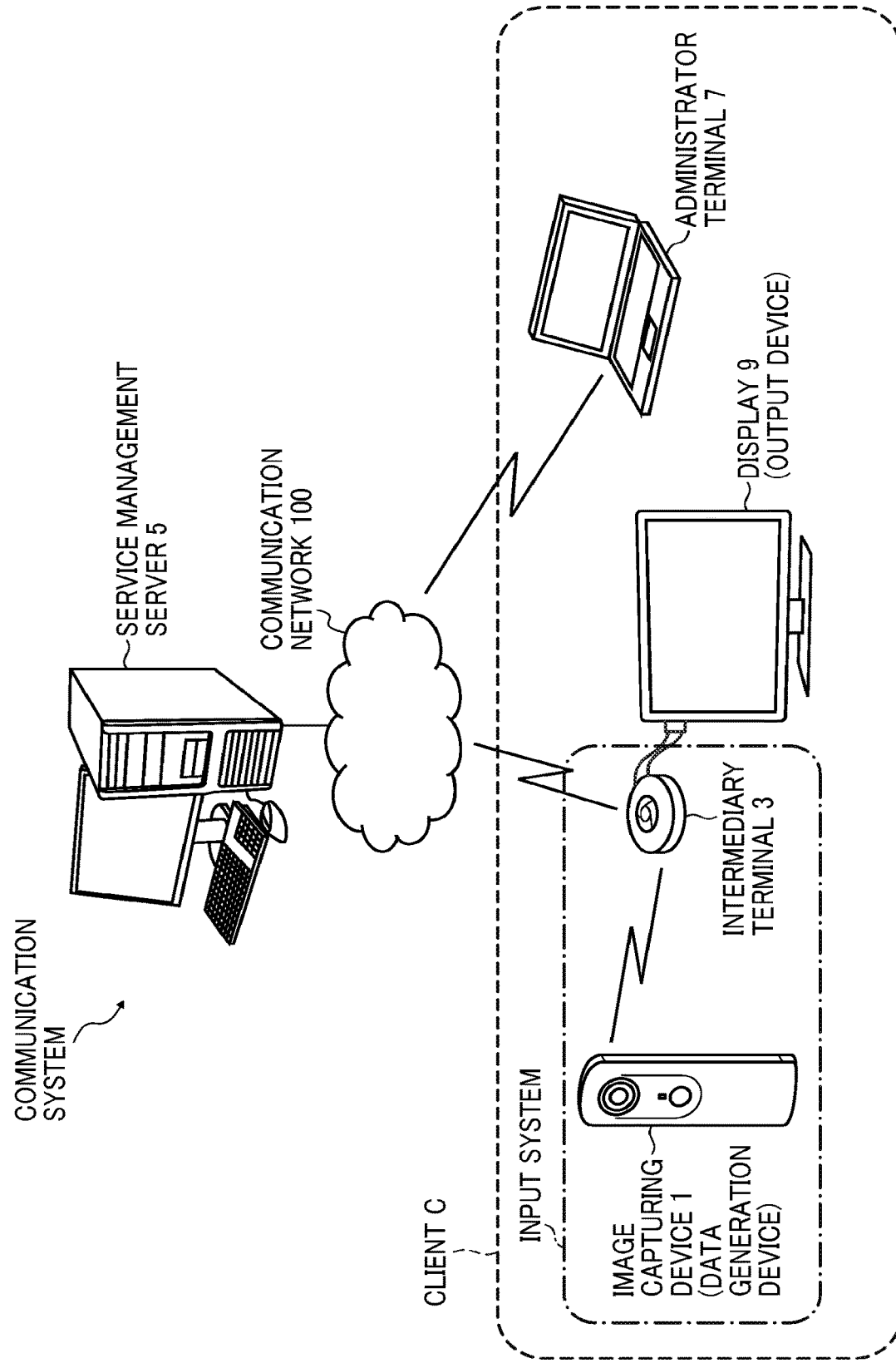
FIG. 1 is a schematic diagram of a communication system according to an embodiment of this disclosure.

Hereinafter, a description is given of an outline of a communication system according to an embodiment of this disclosure with reference to FIG. 1. FIG. 1 is a schematic configuration of a communication system according to the embodiment. Hereinafter, a description is given of an example case applying the communication system to, for example, an educational institution or organization, such as a school.

As illustrated in FIG. 1, the communication system includes, for example, an image capturing device 1 used for capturing images (e.g., full-view spherical images), an intermediary terminal 3, a service management server 5, an administrator terminal 7, and a display 9. The image capturing device 1, the intermediary terminal 3, the administrator terminal 7 and the display 9 are used as devices or terminals disposed at a client C side, such as schools or the like, from a viewpoint of the service management server 5 (service control server).

The image capturing device 1 is a digital camera used for capturing full-view spherical images. The image capturing device 1 includes a body having two fish eye lenses used for stereographic projection, disposed on opposite sides of the body. The image capturing device 1 simultaneously uses two fish eye lenses to capture images in opposite directions on a straight line, synthesizes two images captured using the two fish eye lenses, and generates data of a full-view spherical image in the equirectangular projection. For example, when the image capturing device 1 is installed in a lecture room, a lecture given by a teacher T and reactions of one or more students S can be captured simultaneously.

The intermediary terminal 3 is an example of a communication terminal capable of communicating directly with the communication network 100, such as the Internet. The intermediary terminal 3 communicates with the image capturing device 1, which cannot directly communicate with the communication network 100, using short-range wireless communication to function as an intermediary of communication between the image capturing device 1 and the service management server 5. The short-range wireless communication is a communication performed by using, for example, Wi-Fi, Bluetooth (registered trademark), near field communication (NFC), or the like. In an example case of FIG. 1, the intermediary terminal 3 is used as a dongle receiver connected to the display 9, but the connection state is not limited thereto. For example, the intermediary terminal 3 and the display 9 can be connected via a network. Further, the image capturing device 1 and the intermediary terminal 3 can be connected to each other via a cable, such as a wired local area network (LAN).

The service management server 5 is a server for providing various services, such as various applications, to the intermediary terminal 3 via the communication network 100.

The administrator terminal 7 is a personal computer (PC) used by an administrator on the client C side. The administrator terminal 7 can be used to set to-be-provided service content to the service management server 5 via the communication network 100.

The display 9 is an example of a display device that obtains and displays an image of object captured and acquired by the image capturing device 1 via the intermediary terminal 3.

The image capturing device 1 is an example of an input device while the display 9 is an example of an output device. Further, the image capturing device 1 and the intermediary terminal 3 can be collectively configured as an input system. The service management server 5 and the administrator terminal 7 are configured by a single or a plurality of computers.

(Hardware Configuration)

Hereinafter, a description is given of hardware configurations of the image capturing device 1, the intermediary terminal 3, the service management server 5, and the administrator terminal 7 configuring the communication system with reference to FIGS. 2 to 4.

(Hardware Configuration of Image Capturing Device)

Figure 2:
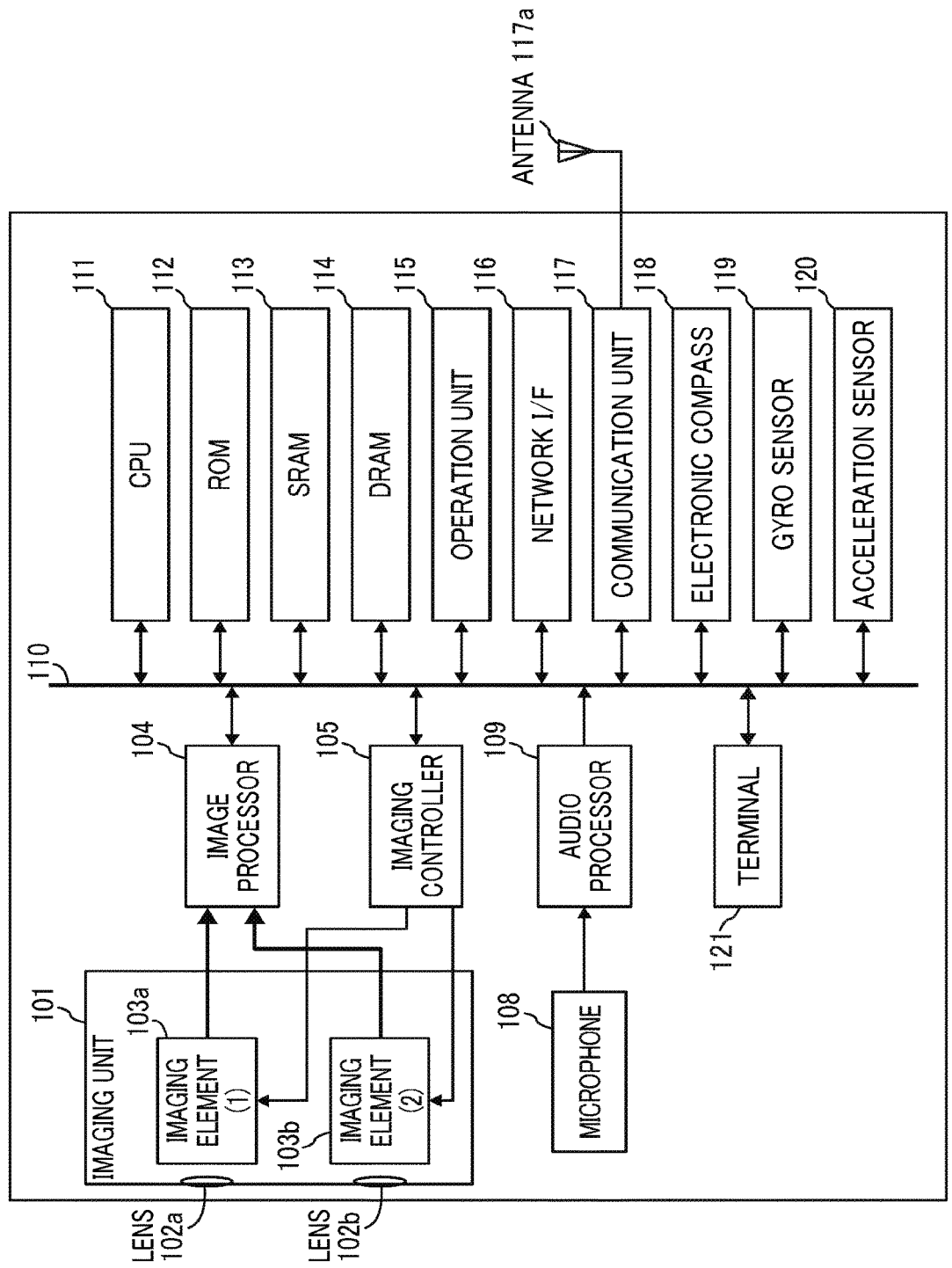
FIG. 2 is an example of a hardware block diagram of an image capturing device according to an embodiment of this disclosure.

FIG. 2 is an example configuration of a hardware block diagram of the image capturing device 1. In this disclosure, the image capturing device 1 is assumed as a digital camera including two imaging devices capable of capturing an omnidirectional image, such as full-view spherical image. The number of imaging devices can be two or more. Further, the image capturing device 1 is not limited to the image capturing device that is designed exclusively for capturing only omnidirectional images. For example, standard digital cameras or smartphones can be attached with an omnidirectional image capture unit to function substantially the same as the image capturing device 1.

As illustrated in FIG. 2, the image capturing device 1 includes, for example, an imaging unit 101, an image processor 104, an imaging controller 105, a microphone 108, an audio processor 109, a central processing unit (CPU) 111, a read only memory (ROM) 112, a static random access memory (SRAM) 113, a dynamic random access memory (DRAM) 114, an operation unit 115, a network interface (I/F) 116, a communication unit 117, an electronic compass 118, a gyro sensor 119, an acceleration sensor 120, and a terminal 121.

The imaging unit 101 includes the two fisheye lenses 102a and 102b, such as wide-angle lenses, each having an angle of view of equal to or greater than 180 degrees to form a hemispheric image. The imaging unit 101 further includes the two imaging elements 103a and 103b corresponding to the two fisheye lenses 102a and 102b, respectively.

Each of the imaging elements 103a and 103b includes an image sensor, such as a complementary metal oxide semiconductor (CMOS) sensor or a charge-coupled device (CCD) sensor, a timing generation circuit, and a group of registers. The image sensor converts an optical image formed by the fisheye lenses 102a and 102b (i.e., wide-angle lenses) into electric signals to output image data. The timing generation circuit generates horizontal and vertical synchronization signals, pixel clocks and the like for the image sensor. Various commands, parameters and the like for operations of the imaging elements 103a and 103b are set in the group of registers.

Each of the imaging elements 103a and 103b of the imaging unit 101 is connected to the image processor 104 via a parallel I/F bus. Further, each of the imaging elements 103a and 103b of the imaging unit 101 is connected to the imaging controller 105 via a serial I/F bus such as an inter-integrated circuit (i2c) bus. The image processor 104, the imaging controller 105, and the audio processor 109 are connected to the CPU 111 via a bus 110. Further, the ROM 112, the SRAM 113, the DRAM 114, the operation unit 115, the network interface I/F 116, the communication unit 117, and the electronic compass 118 are also connected to the bus 110.

The image processor 104 acquires the image data from each of the imaging elements 103a and 103b via the parallel I/F bus. Then, the image processor 104 performs given processing on the image data and synthesizing the image data to generate data of the equirectangular projection image.

The imaging controller 105 usually functions as a master device while each of the imaging elements 103a and 103b usually functions as a slave device. The imaging controller 105 sets commands and the like in the group of registers of the imaging elements 103a and 103b via the i2c bus. The imaging controller 105 receives required commands and the like from the CPU 111. Further, the imaging controller 105 acquires status data and the like of the group of registers of the imaging elements 103a and 103b via the i2c bus. Then, the imaging controller 105 transmits the acquired status data to the CPU 111.

The imaging controller 105 instructs the imaging elements 103a and 103b to output the image data at a time when a shutter button of the operation unit 115 is pressed. The image capturing device 1 may have a preview function and a function for displaying still image and movie image using a display (e.g., a display of smart phone). In a case of movie image, the image data are continuously output from the imaging elements 103a and 103b with a pre-set frame rate, such as frames per minute.

Further, to be described later, the imaging controller 105 operates in cooperation with the CPU 111 to synchronize the output timing of the image data of the imaging elements 103a and 103b. In the embodiment, the image capturing device 1 does not have a display, but the image capturing device 1 can be provided with the display.

The microphone 108 collects sound from the surroundings of the image capturing device 1 and converts the collected sound into audio data or signal. The audio processor 109 acquires the audio data output from the microphone 108 via an I/F bus and performs given processing on the audio data.

The CPU 111 controls an entire operation of the image capturing device 1 and performs necessary processing. The ROM 112 stores various programs for the CPU 111. Each of the SRAM 113 and the DRAM 114 operates as a work memory to store the program loaded from the ROM 112 for execution by the CPU 111 or data in current processing. In particular, the DRAM 114 stores the image data currently processed by the image processor 104 and data of the equirectangular projection image (Mercator image) on which processing has been performed.

The operation unit 115 collectively refers to various operation keys, a power switch, and the shutter button. The user operates the operation unit 115 to input various capture modes and capture conditions.

The network I/F 116 collectively refers to an interface circuit such as a universal serial bus (USB) I/F that allows the image capturing device 1 to communicate data with an external media such as a secure digital (SD) card or an external personal computer. The network I/F 116 can support wired and wireless communications. The data of equirectangular projection image stored in the DRAM 114 can be recorded on an external medium via the network I/F 116, and can be transmitted to an external terminal (device), such as a smart phone, via the network I/F 116 as required.

The communication unit 117 communicates with an external terminal or device, such as a smartphone, using a short-range wireless communication via an antenna 117*a* provided for the image capturing device 1. The communication unit 117 can transmit the data of equirectangular projection image to the external terminal or device, such as the smartphone.

The electronic compass 118 calculates an orientation of the image capturing device 1 from the magnetism of the earth and outputs azimuth information. This azimuth information is an example of related information (metadata) compatible to exchangeable image file format (Exif), and is used for image processing, such as image correction of captured image. The related information includes, for example, date and time of capturing image, and data amount of image data.

The gyro sensor 119 is a sensor for detecting a change of angle (roll angle, pitch angle, yaw angle) caused by a movement of the image capturing device 1. The angle change is an example of related information (metadata) compatible to Exif, and is used for image processing, such as image correction of captured image.

The acceleration sensor 120 is a sensor for detecting acceleration in the three axial directions. Based on the acceleration detected by the acceleration sensor 120, the image capturing device 1 calculates an attitude (angle relative to the gravity direction) of the image capturing device 1. By providing both the gyro sensor 119 and the acceleration sensor 120 to the image capturing device 1, the accuracy of image correction can be improved.

The terminal 121 is a concave-shaped terminal compatible for micro USB.

(Hardware Configuration of Intermediary Terminal)

Figure 3:
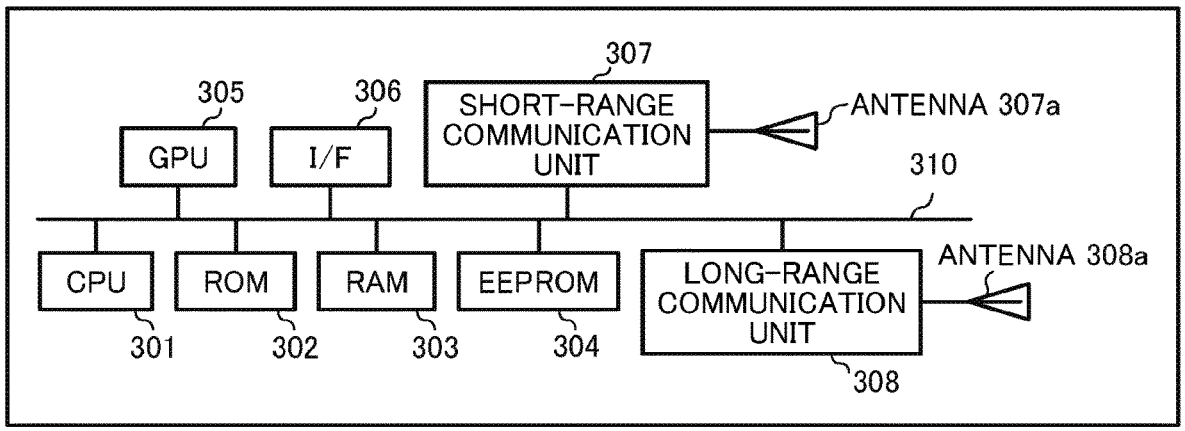
FIG. 3 is an example of a hardware block diagram of an intermediary terminal according to an embodiment of this disclosure.

FIG. 3 is an example of a hardware block diagram of the intermediary terminal 3. As illustrated in FIG. 3, the intermediary terminal 3 includes, for example, a CPU 301, a ROM 302, a RAM 303, an electrically erasable programmable ROM (EEPROM) 304, a graphics processing unit (GPU) 305, an interface (I/F) 306, a short-range communication unit 307, an antenna 307*a*, a long-range communication unit 308, an antenna 308*a*, and a bus line 310.

The CPU 301 controls the entire operation of the intermediary terminal 3 and executes necessary processing. The ROM 302 stores various programs executable by the CPU 301. The RAM 303 is a work memory, and stores a program executable by the CPU 301 and data in the middle of processing. The EEPROM 304 reads or writes data in accordance with the control of the CPU 301. The GPU 305 performs processing for rendering an image (still image or moving picture) to be displayed on a screen of the display 9. The interface I/F 306 is an input and output portion for connecting to an interface on the display 9. The interface I/F 306 may include a communication interface used for communicating with the image capturing device 1 and the service management server 5 using a communication method other than the long-range wireless communication.

The short-range communication unit 307 performs a communication using a short-range wireless communication, such as Wi-Fi (registered trademark), near field communication (NFC), or Bluetooth (registered trademark) to communicate with the image capturing device 1 using a short-distance communication. The antenna 307*a* is an antenna of the short-range communication unit 307.

The long-range communication unit 308 performs a communication using the technology of Long Term Evolution (LTE) to communicate with the service management server 5 via the communication network 100 using a long-range wireless communication. The antenna 308*a* is an antenna of the long-range communication unit 308.

The bus line 310 is an address bus and a data bus for electrically connecting each of the components, such as the CPU 301, illustrated in FIG. 3.

(Hardware Configuration Service Management Server)

Figure 4:
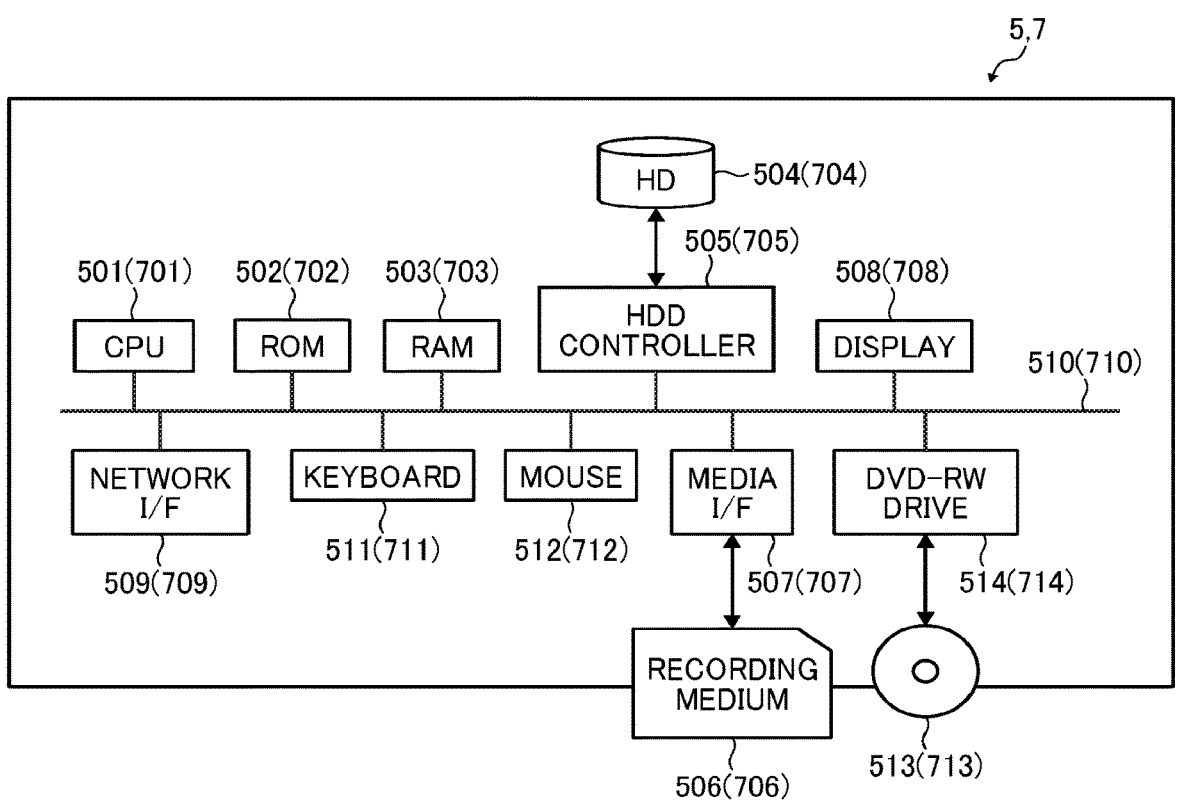
FIG. 4 is an example of a hardware block diagram of a service management server and an administrator terminal according to an embodiment of this disclosure.

FIG. 4 is an example of a hardware block diagram of the service management server 5. As illustrated in FIG. 4, the service management server 5 configured by a single or a plurality of computers, includes, for example, a CPU 501, a ROM 502, a RAM 503, a hard disk (HD) 504, a hard disk drive (HDD) controller 505, a display 508, a media I/F 507, a network I/F 509, a bus line 510, a keyboard 511, a mouse 512, and a digital versatile disk rewritable (DVD-RW) drive 514.

The CPU 501 controls the entire operation of the service management server 5. The ROM 502 stores programs such as an initial program loader (IPL) to boot the CPU 501. The CPU 501 uses the RAM 503 as a work area when executing programs or processing data. The HD 504 stores various data such as programs. The HDD controller 505 controls reading and writing of data from and to the HD 504 under the control of the CPU 501. The display 508 displays various information such as cursors, menus, windows, characters, or images. The media I/F 50 controls reading and writing (storing) of data from and to the recording medium 506, such as a flash memory. The network I/F 509 is an interface used for performing data communication using the communication network 100. The bus line 510, such as an address bus and a data bus, electrically connects the above described parts or devices indicated in FIG. 4, such as the CPU 501, with each other.

The keyboard 511 is a type of input unit having with a plurality of keys for inputting characters, numerals, various instructions, and the like. The mouse 512 is a type of input unit for selecting and executing various instructions, selecting a process target, and moving a cursor. The DVD-RW drive 514 controls reading and writing of data from and to a DVD-RW 513, which is as an example of a removable recording medium. Further, in addition to DVD-RW, DVD-R and Blu-ray (registered trademark) disc can be used.

(Hardware Configuration of Administrator Terminal)

As illustrated in FIG. 4, the administrator terminal 7, configured by a single or a plurality of computers, includes, for example, a CPU 701, a ROM 702, a RAM 703, an HD 704, a HDD controller 705, a display 708, a media I/F 707, a network I/F 709, a data bus 710, a keyboard 711, a mouse 712, and a DVD-RW drive 714.

Since the CPU 701, ROM 702, RAM 703, HD 704, HDD controller 705, display 708, media I/F 707, network I/F 709, data bus 710, keyboard 711, mouse 712, and DVD-RW drive 714 respectively employ the same configuration of the CPU 501, ROM 502, RAM 503, HD 504, HDD controller 505, display 508, media I/F 507, the network I/F 509, bus line 510, keyboard 511, mouse 512, and DVD-RW drive 514 in the service management server 5, the descriptions of the hardware configuration of the administrator terminal 7 is omitted.

(Functional Configuration of Communication System)

Figure 5:
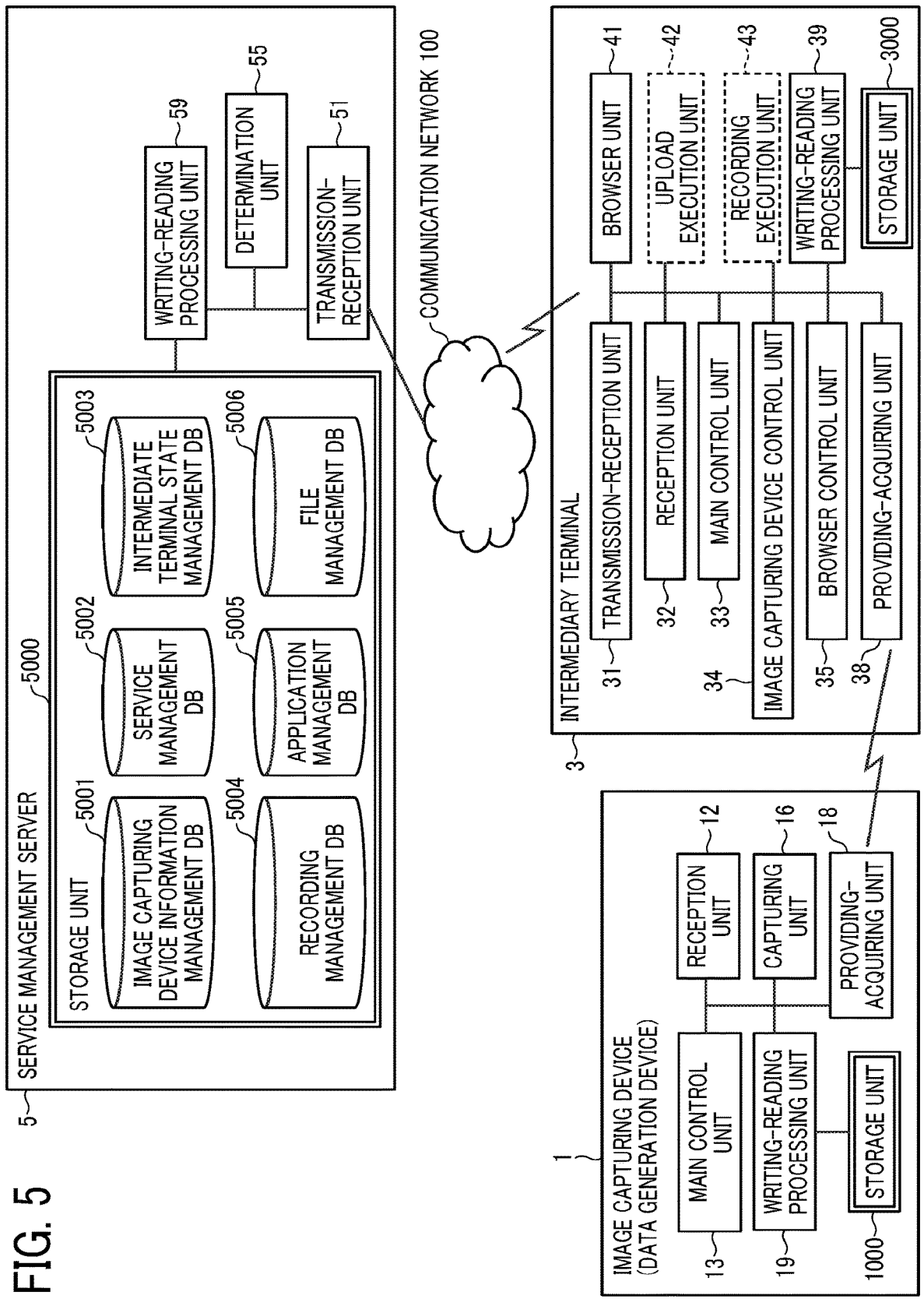
FIG. 5 is an example of a functional block diagram of a communication system according to an embodiment of this disclosure.

Hereinafter, a description is given of a functional configuration of the communication system with reference to FIGS. 5 to 8. FIG. 5 is a an example of a functional block diagram of the communication system.

(Function Configuration of Image Capturing Device)

At first, the functional configuration of the image capturing device 1 is described with reference to FIG. 5. As illustrated in FIG. 5, the image capturing device 1 includes, for example, a reception unit 12, a main control unit 13, a capturing unit 16, a providing-acquiring unit 18, and a writing-reading processing unit 19. Each of the functional units illustrated in FIG. 5 can be implemented by any one of the components indicated in FIG. 2 under the instruction from the CPU 111 executing programs installed on the image capturing device 1, loaded on the SRAM 113 from the DRAM 114.

The image capturing device 1 also includes, for example, a storage unit 1000 implemented by the SRAM 113 and the DRAM 114.

(Functional Configuration of Image Capturing Device)

Hereinafter, a description is given of a functional configuration of the image capturing device 1 in detail with reference to FIG. 5.

The reception unit 12 receives an operation performed by an administrator and the like, and then instructs other functional units, such as the main control unit 13, based on the operation contents.

The main control unit 13 controls the image capturing device 1 entirely. The capturing unit 16 generates image data by capturing an object.

The providing-acquiring unit 18 communicates with other devices or terminals using the short-range radio communication to provide data to other devices or terminals, and acquire data from other devices or terminals.

The writing-reading processing unit 19 stores data in the storage unit 1000 and reads out data from the storage unit 1000.

(Functional Configuration of Intermediary Terminal)

Hereinafter, a description is given of a function configuration of the intermediary terminal 3 with reference to FIG. 5. As illustrated in FIG. 5, the intermediary terminal 3 includes, for example, a transmission-reception unit 31, a reception unit 32, a main control unit 33, an image capturing device control unit 34, a browser control unit 35, a providing-acquiring unit 38, a writing-reading processing unit 39, a browser unit 41, a upload execution unit 42, and a recording execution unit 43. Each of the functional units illustrated in FIG. 5 can be implemented by any one of the components indicated in FIG. 3 under the instruction from the CPU 301 executing programs installed on the intermediary terminal 3, loaded on the RAM 303 from the EEPROM 304.

The intermediary terminal 3 also includes, for example, a storage unit 3000 implemented by the RAM 303 and the EEPROM 304.

(Functional Configuration of Intermediary Terminal)

Hereinafter, a description is given of a functional configuration of the intermediary terminal 3 in detail with reference to FIG. 5.

The transmission-reception unit 31 receives an operation performed by an administrator, and then instructs other functional units, such as the main control unit 33, based on the operation contents.

The reception unit 32 receives an operation performed by an administrator, and then instructs other functional units, such as the main control unit 33, based on the operation contents.

The main control unit 33 controls the intermediary terminal 3 entirely, and transmits given instructions and requests, for example, to the image capturing device control unit 34 and the browser control unit 35 for example.

The image capturing device control unit 34 generates, for example, the upload execution unit 42 and the recording execution unit 43 to receive a service used for the image capturing device 1.

The browser control unit 35 manages a browser ID for identifying the browser unit 41 which is a control target.

The providing-acquiring unit 38 communicates with other devices or terminals using the short-range radio communication to provide data to other devices or terminals, and acquire data from other devices or terminals. The providing-acquiring unit 38 cam be used as a providing unit and acquisition unit in this description.

The writing-reading processing unit 39 stores data in the storage unit 3000 and reads out data from the storage unit 3000.

The browser unit 41 is implemented by a browser, which is a browser software.

The upload execution unit 42 is an example of processing execution unit of the intermediary terminal 3, which contributes to the process of uploading image data, such as still image or movie image, generated mainly by the image capturing device 1.

The recording execution unit 43 is another example of processing execution unit of the intermediary terminal 3, which contributes to a process of instructing the image capturing device 1 to record image data, and a process of uploading image data, such as still image or movie image, generated mainly by the image capturing device 1. The recording execution unit 43 may be used to set the settings used for the recording and uploading of image data.

(Functional Configuration of Service Management Server)

Hereinafter, a description is given of a functional configuration of the service management server 5 with reference to FIG. 5. As illustrated in FIG. 5, the service management server 5 includes, for example, a transmission-reception unit 51, a determination unit 55, and a writing-reading processing unit 59. Each of the functional units illustrated in FIG. 5 can be implemented by any one of the components indicated in FIG. 4 under the instruction from the CPU 501 executing programs installed on the intermediary terminal 3, loaded on the RAM 503 from the HD 504.

The service management server 5 also includes, for example, a storage unit 5000 implemented by the RANI 503 and the HD 504 illustrated in FIG. 4. Since the items of the same name (columns) in the following table show the same meaning, the second and subsequent descriptions will be omitted.

(Image Capturing Device Information Management Table)

FIG. 6A is a conceptual diagram of an image capturing device information management table. The storage unit 5000 includes, for example, an image capturing device information management database (DB) 5001 storing the image capturing device information management table illustrated in FIG. 6A. The image capturing device information management table stores and controls contract identification (ID), image capturing device ID, media access control (MAC) address, user ID, internet protocol (IP) address, device password, intermediary terminal ID, service ID, and connection state between the image capturing device and the intermediary terminal in association with each other for each contract ID.

The contract ID is an example of contract identification information identifying each contract content, such as a contract number or the like, when an administrator (and user) is to receive a service.

The image capturing device ID is an example of image capturing device identification information identifying each image capturing device. The image capturing device identification information may be also referred to as device identification information. The MAC address can be used as the image capturing device ID.

The user ID is an example of user identification information identifying each user who uses the image capturing device 1 and the intermediary terminal 3. The user ID includes, for example, a user name and mail address. The user may be an administrator, a guest, or the like. The user ID may not necessarily be associated with other information.

The device password is a password uniquely assigned to the image capturing device 1, which is necessary for the image capturing device 1 for receiving a service.

The intermediary terminal ID is an example of intermediary terminal identification information identifying each intermediary terminal associated with the image capturing device 1. The intermediary terminal identification information may be also referred to as terminal identification information.

The IP address is an example of information indicating an address of the image capturing device 1 disposed on a network.

The service ID is an example of service identification information identifying each service content used for the image capturing device 1.

The connection state between the image capturing device and the intermediary terminal is information indicating a connection state between the image capturing device 1 and the intermediary terminal 3.

(Service Management Table)

FIG. 6B is a conceptual diagram of a service management table. The storage unit 5000 includes, for example, a service management DB 5002 storing the service management table illustrated in FIG. 6B. The service management table stores and controls service ID, input application ID, output application ID, and browser ID in association with each other. As indicated in FIG. 6B, the output application ID and the browser ID may not necessarily be associated with the service ID.

Further, the service ID may be associated with the output application ID alone, or the service ID may be associated with the output application ID and the browser ID alone. The service ID illustrated in FIG. 6B is just one example, and any service ID other than the service ID illustrated in FIG. 6B can be associated with other information. Further, the service ID can be a service name. Further, in addition to the service ID, the service name can be stored and controlled using the service management table of FIG. 6B in association with other information.

The input application ID is an example of input application identification information identifying each input application used for executing a process of inputting data to the service management server 5.

The output application ID is an example of output application identification information identifying each output application used for executing a process of outputting data from the service management server 5.

The browser ID is an example of browser identification information identifying each browser, which is a browser software.

(Intermediary Terminal State Management Table)

FIG. 7A is a conceptual diagram of an intermediary terminal state management table. The storage unit 5000 includes, for example, an intermediary terminal state management DB 5003 storing the intermediary terminal state management table illustrated in FIG. 7A. The intermediary terminal state management table stores and controls contract ID, intermediary terminal ID, terminal local IP address, terminal state, browser ID, browser state, and output application ID in association with each other for each contract ID.

The terminal local IP address is an example of local IP address of the intermediary terminal 3. The terminal state is information indicating a connection state between the service management server 5 and the intermediary terminal 3. The browser state is information of activation state indicating whether the browser unit 41 is activated or not activated.

(Recording Management Table)

FIG. 7B is a conceptual diagram of a recording management table. The storage unit 5000 includes, for example, a recording management DB 5004 storing the recording management table illustrated in FIG. 7B. The recording management table stores and controls image capturing device ID, recording time (start time and end time of recording), and upload start time in association with each other for each image capturing device ID.

The recording start time is a time at which the image capturing device 1 starts a recording operation.

The recording end time is a time at which the image capturing device 1 ends or terminates the recording operation.

The upload time is a time at which the intermediary terminal 3 acquires image data recorded by the image capturing device 1 and then uploads the image data to the service management server 5.

(Application Management Table)

FIG. 8A is a conceptual diagram of an application management table. The storage unit 5000 includes, for example, an application management DB 5005 storing the application management table illustrated in FIG. 8A. The application management table stores and controls application ID, application type, application universal resource locator (application URL), and information of corresponding browser or corresponding apparatus in association with each other. The application ID illustrated in FIG. 8A is just one example, and any application ID other than the application ID illustrated in FIG. 8A can be associated with other information.

The application ID is an example of identification information identifying each application. Further, the application ID can be an application name, or the application ID can be associated with the application name and stored and controlled on the service management server 5.

The application type is an example of type information indicating type of each application, such as an input application (In-application) or an output application (Out-application). The "In" and "Out" illustrated in FIG. 8A are examples of type information, and any type information other than the types of "In" and "Out" can be stored and controlled. For example, applications that perform processing other than the input processing and the output processing, such as an application used for executing computation processing such as image processing and statistical processing, and an application used for executing control processing for controlling the image capturing device 1 can be associated with given type information, different from the type information of "In" and "Out." Further, these applications can be stored and controlled using the application management table as described above.

The application URL is an example of a storage location information indicating a storage location where each application is stored.

The corresponding browser or corresponding apparatus represent information indicating whether a specific application, identified by a specific application ID, corresponds to a specific browser or a specific device, such as an intermediary terminal or the like. The corresponding browser can be information indicating a type of corresponding browser (e.g., browser for mobile device) and information indicating a type of corresponding apparatus.

(File Management Table)

FIG. 8B is a conceptual diagram of a file management table. The storage unit 5000 includes, for example, a file management DB 5006 storing the file management table illustrated in FIG. 8B. The file management DB 5006 is used by the service management server 5 to control or manage files of data input from the image capturing device 1, in the service management server 5. The file management table stores and controls contract ID, user ID and file (file name) in association with each other for each contract ID. The file name indicates each file name of the uploaded input data (target data).

(Function of Service Management Server)

Hereinafter, a description is given of a functional configuration of the service management server 5 in detail with reference to FIG. 5.

The transmission-reception unit 51 is implemented by an instruction from the CPU 501 (FIG. 4) and processing for the network I/F 509. For example, the transmission-reception unit 51 transmits and receives data or information to and from other terminal, device or system via the communication network 100.

The determination unit 55, implemented by an instruction from the CPU 501 (FIG. 4), performs various determination processing.

The writing-reading processing unit 59, implemented by an instruction from the CPU 501 (FIG. 4), performs processing of storing various data in the storage unit 5000 and reading out various data stored in the storage unit 5000.

(Processing and Operation)

Hereinafter, a description is given of processing and operation with reference to FIGS. 9 to 15.

(Pre-Registration)

Hereinafter, a description is given of a pre-registration of service content when an administrator on the client C side (e.g., school) uses the administrator terminal 7 to access the service management server 5 and registers the service content in advance using a screen with reference to FIGS. 9A and 9B. FIG. 9A illustrates a screen used as an image capturing device registration screen. FIG. 9B illustrates a screen used as a service content setting screen. The screen information used for creating the screens of FIGS. 9A and 9B is transmitted from the service management server 5 to the administrator terminal 7, and then the screens of FIGS. 9A and 9B can be displayed on a display of the administrator terminal 7.

When the administrator logs in from the administrator terminal 7 using the user ID illustrated in FIG. 6A, the image capturing device registration screen is displayed on the display 708 of the administrator terminal 7 as illustrated in FIG. 9A. Further, the administrator can log in using the contract ID instead of the user ID. In this case, the contract ID is used as the user ID.

As illustrated in FIG. 9A, the image capturing device registration screen displays, for example, user ID (e.g., ando@ . . . ) indicating a log-in user, and input fields of image capturing device ID, password of image capturing device, IP address of image capturing device, and of intermediary terminal ID.

Further, the image capturing device registration screen displays an "application" button to be pressed by a user when sifting the screen to the service content setting screen (FIG. 9B) used for setting the detailed service content for each image capturing device.

Further, the image capturing device registration screen (FIG. 9A) displays a "confirm connection" button for confirming a connection to the service management server 5, and a "enter" button for confirming and transmitting the registration content to the service management server 5.

Further, if the user login operation and the in-advance contract are not required for setting the service content, the administrator terminal 7 accesses the service management server 5 to set each service for each image capturing device without the user login operation. In this case, the user ID is not displayed on the image capturing device registration screen of FIG. 9A.

If a user presses the "application" button (FIG. 9A), as illustrated in FIG. 9B, the service content setting screen is displayed. The service content setting screen displays, for example, a check box for each service, such as upload service, slide show service, recording service, and live distribution service settable for each image capturing device. The check box is checked when the service is to be used. If the image capturing device is to use the recording service, the recording start time and recording end time of the image capturing device 1, and the upload start time of image data, recorded and generated by the image capturing device 1, is required to input. The checking using the check box is just one example, and any method that can identify the service can be used. For example, a service can be activated or not using an ON-OFF selection, or a service name to be utilized can be selected from candidate service names by a user.

The slide show service is a service that requires the upload service. Further, the slide show display of still image and the slide show display of movie image (live distribution) are mutually exclusive, and when one slide show display is selected, the other slide show display cannot be selected.

The to-be-set candidate service list illustrated in FIG. 9B corresponds to the service ID illustrated in FIG. 6B. For example, the services illustrated in FIG. 9B such as the upload service (if slide show service is not checked), the recording service, and the live distribution service correspond to "Tag_CmUpload," "Tag_CmRecord," and "Tag_CmLive" illustrated in FIG. 6B, respectively. Further, if the upload service is checked and the slide show service is also checked, a service ID, such as "Tag_CmSlide1" illustrated in FIG. 6B corresponds to the checked service. Such association between the screen of FIG. 9B and the service ID of FIG. 6B is just one example, and can be associated with using other method.

Further, as described with reference to FIG. 6B, the candidate service list illustrated in FIG. 9B is just one example, and any service other than the service illustrated in FIG. 9B can be set. For example, a service, which is used to transmit a capturing instruction to the image capturing device 1 from a user terminal, can be set. Further, in FIG. 9B, the service content setting screen displays a service name, such as "upload service" as the candidate service, but is not limited thereto. For example, the service content setting screen can display a service ID corresponding to a target service.

When the service content is set and then a "return" button is pressed on the service content setting screen (FIG. 9B), the image capturing device registration screen (FIG. 9A) is displayed again on the display screen of the administrator terminal 7 by retaining the set service content.

Further, if information is input in the input field of the image capturing device registration screen (FIG. 9A) and then the "enter" button is pressed, the registration content is transmitted to the service management server 5. Then, the service management server 5 updates the registration content for the user ID identifying the log-in user by storing and controlling the image capturing device ID, password of image capturing device, IP address of image capturing device, intermediary terminal ID input on the image capturing device registration screen (FIG. 9A), and the service ID corresponding to the service set on the service content setting screen service (FIG. 9B) in association with each other. Specifically, the corresponding information is respectively updated in the image capturing device information management table of FIG. 6A. Since the contract ID is managed or controlled in association with the user ID at the service management server 5, the contract ID can be also identified if the user ID is identified.

If a log-in is not required for setting the service, the user ID is set as blank, and the set registration contents are stored in association with each other in the image capturing device information management table of FIG. 6A. Further, in a case that the in-advance input of contract is not required for setting the service, without associating the contract ID to the registration content initially, the contract ID is registered in the image capturing device information management table of FIG. 6A with other information.

(Communication using Service)

Hereinafter, a description is given of examples of communication using each service, set on the service content setting screen (FIG. 9B) with reference to FIG. 10. Step numbers in FIG. 10 correspond to step numbers to be described later with reference to FIGS. 14 and 15.

(Service Content 1)

Figure 10A:
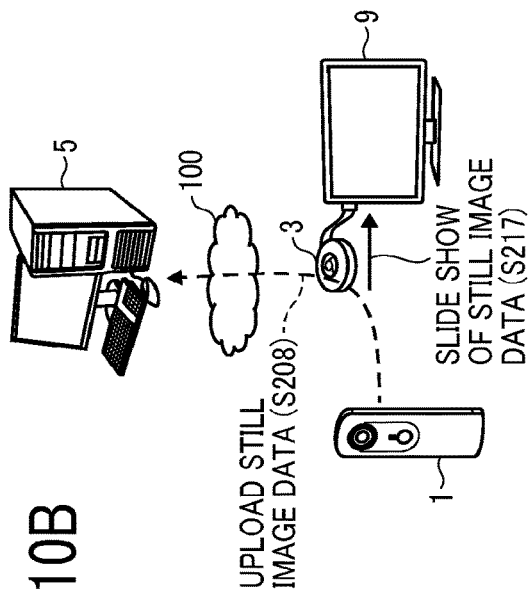
FIG. 10A is a schematic diagram of a communication path of uploading still image data according to an embodiment of this disclosure.

FIG. 10A is a schematic diagram of a communication path of uploading still image data. As illustrated in FIG. 10A, the intermediary terminal 3 acquires the still image data from the image capturing device 1 using communication such as short-range wireless communication, and then the intermediary terminal 3 uploads the still image data to the service management server 5 via the communication network 100 (see step S208 in FIG. 14). This processing corresponds to the "upload service" displayed on the service content setting screen of FIG. 9B.

(Service Content 2)

Figure 10B:
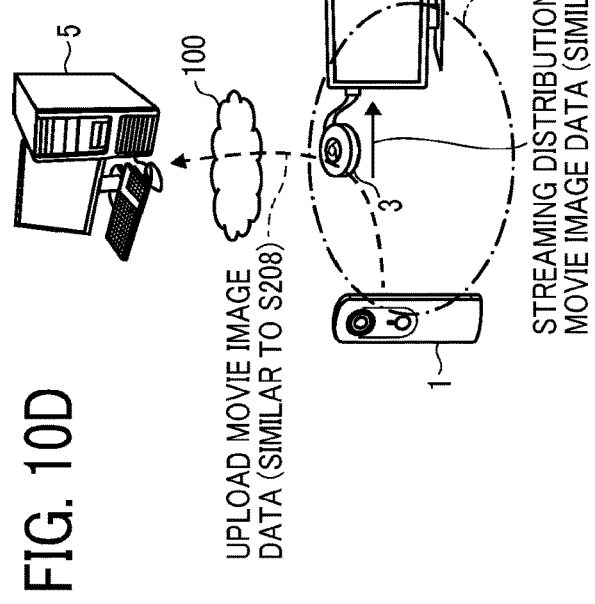
FIG. 10B is a schematic diagram of a communication path of uploading still image and performing a slide show of still image data according to an embodiment of this disclosure.

FIG. 10B is a schematic diagram of a communication path of uploading still image data and performing a slide show of still image data. As illustrated in FIG. 10B, in addition to the above described service content 1, the intermediary terminal 3 transmits the still image data, acquired from the image capturing device 1 using communication such as short-range wireless communication, to the display 9 to display the still image using the display 9 (see step S217 in FIG. 14). This processing corresponds to the "slide show service" displayed on the service content setting screen of FIG. 9B.

(Service Content 3)

Figure 10C:
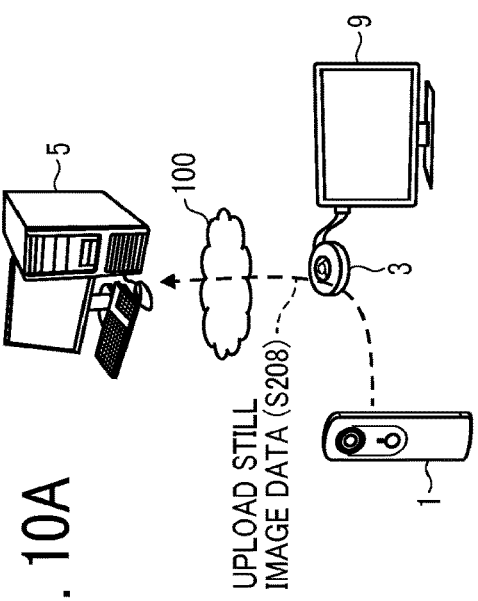
FIG. 10C is a schematic diagram of communication path of recording and uploading movie image data according to an embodiment of this disclosure.

FIG. 10C is a schematic diagram of communication path of recording and uploading data. As illustrated in FIG. 10C, the intermediary terminal 3 causes the image capturing device 1 to execute the recording (see step S310 in FIG. 15), acquires movie image data (recorded image data) from the image capturing device 1 using communication such as short-range wireless communication, and then uploads the movie image data to the service management server 5 via the communication network 100 (see step S323 in FIG. 15). The recorded image data can be still image data, movie image data, or both of them. This processing corresponds to the "recording service" displayed on the service content setting screen of FIG. 9B.

(Service Content 4)

Figure 10D:
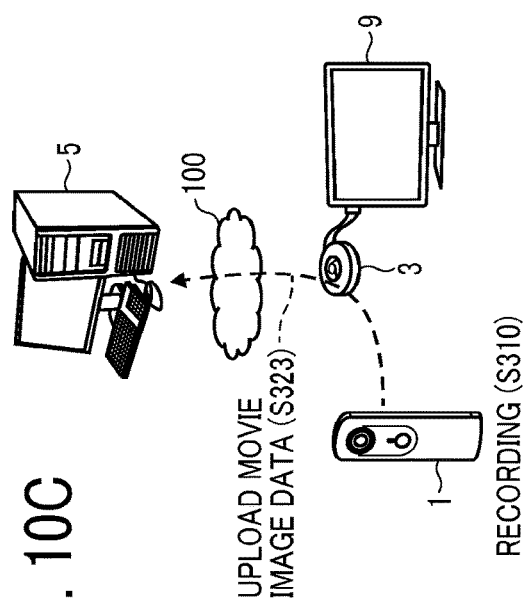
FIG. 10D is a schematic diagram of a communication path of uploading movie image data and performing a slideshow of movie image data.

FIG. 10D is a schematic diagram of a communication path of uploading and streaming of movie image data. As illustrated in FIG. 10D, the intermediary terminal 3 uploads the movie image data as similar to uploading the still image data (see step S208 in FIG. 14). Further, the intermediary terminal 3 performs the streaming distribution and displaying of the movie image data using the same communication path used for the slide show displaying of still image data (see step S217 in FIG. 14). A series of processing of acquiring the movie image data from the image capturing device 1, performing the streaming distribution, and displaying the movie image corresponds to the service content of the live distribution. This processing corresponds to the "live distribution service" displayed on the service content setting screen of FIG. 9B.

(Processing to Start Each Service Processing)

Figure 12:
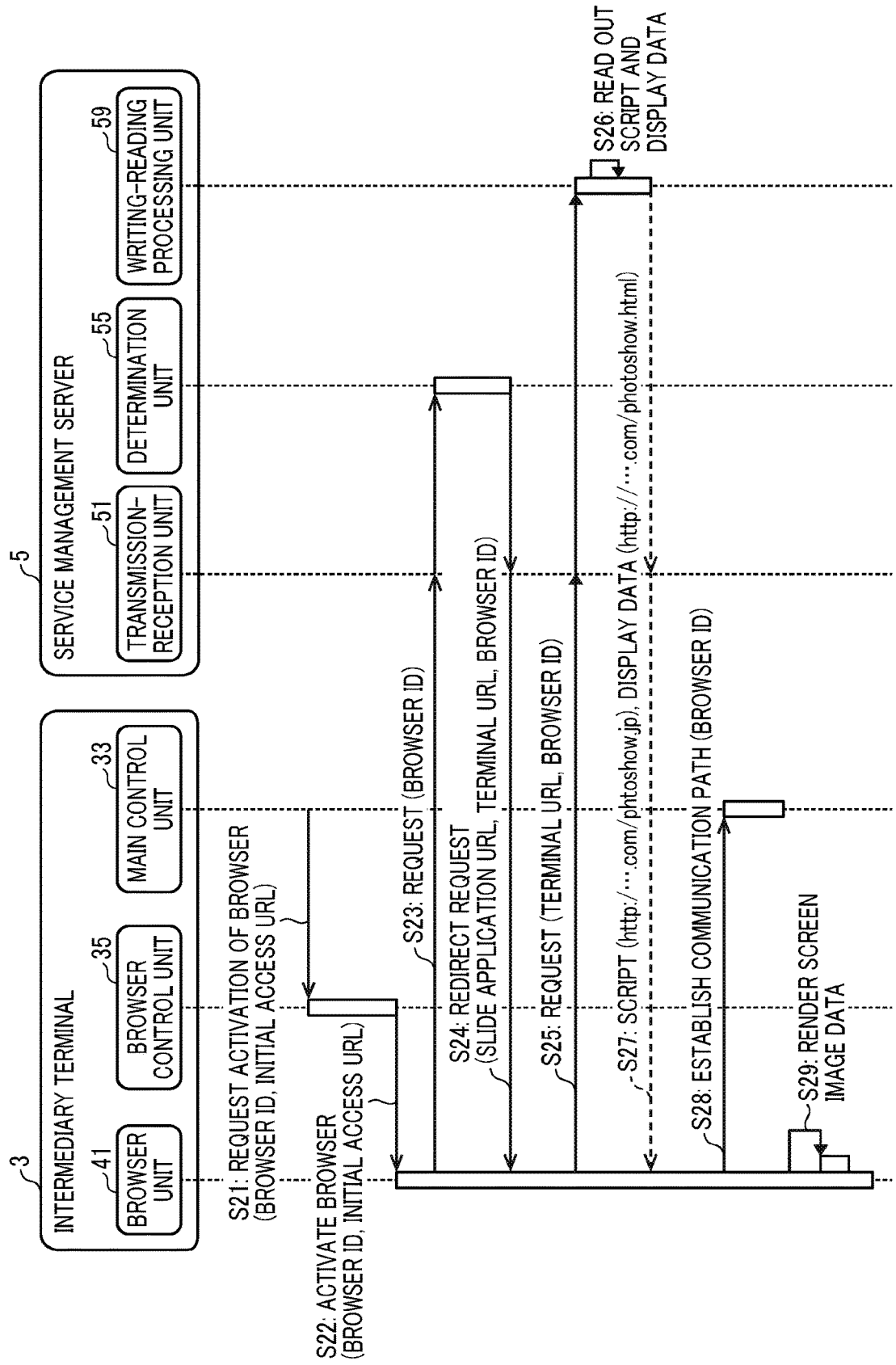

Hereinafter, a description is given of pre-processing that is performed before starting the processing of each service content with reference to FIGS. 11 and 12. FIGS. 11 and 12 are sequences illustrating a pre-processing that is performed before starting the processing of each service content.

At first, when the reception unit 32 receives a notification indicating the intermediary terminal 3 is turned on by supplying power under an instruction of an administrator at the client C side, the reception unit 32 activates the main control unit 33 (step S1).

In response to the activation in step S1, under the instruction of the main control unit 33, the transmission-reception unit 31 establishes a communication path between the transmission-reception unit 31 and the transmission-reception unit 51 to receive a request from the transmission-reception unit 51 of the service management server 5 (step S2). At this stage, the intermediary terminal 3 transmits an intermediary terminal ID identifying the intermediary terminal 3 to the transmission-reception unit 51, and then the transmission-reception unit 51 transmits the intermediate terminal ID to the writing-reading processing unit 59.

Then, the writing-reading processing unit 59 updates the terminal state stored in the intermediary terminal state management DB 5003 from "not connected" to "connected" based on the intermediary terminal ID (step S3).

Then, the main control unit 33 transmits a request for starting a service to the image capturing device control unit 34 (step S4).

Then, under the instruction of the image capturing device control unit 34, the transmission-reception unit 31 transmits a request of a service list including the service content associated with the intermediary terminal 3 by the pre-registration processing (FIG. 9) to the transmission-reception unit 51 of the service management server 5 (step S5).

The service content includes, for example, service ID identifying each service associated with the intermediary terminal 3, application ID identifying each application to be executed to implement the service, and one or more programs corresponding to the application ID. The programs can be stored in the intermediary terminal 3 in advance. At this stage, the intermediary terminal ID identifying the intermediary terminal 3 (requester) is also transmitted to the transmission-reception unit 51, and then the transmission-reception unit 51 transmits the intermediary terminal ID to the writing-reading processing unit 59.

Then, the writing-reading processing unit 59 sequentially searches the image capturing device information management DB 5001, the service management DB 5002, and the application management DB 5005 using the intermediary terminal ID as a search key to read out the corresponding application URL (step S6). For example, if the intermediary terminal ID is "Eg001-01," at first, the writing-reading processing unit 59 uses the intermediary terminal ID of "Eg001-01" as a search key to search the image capturing device information management DB 5001 (FIG. 6A) to retrieve or read out the corresponding service ID of "Tag_CmSlide1."

Then, the writing-reading processing unit 59 uses the service ID of "Tag_CmSlide1" as a search key to search the service management DB 5002 (FIG. 6B) to read out the application ID of "AP_EgCmUpload" of the corresponding input application.

Then, the writing-reading processing unit 59 uses the application ID of "AP_EgCmUpload" of the input application as a search key to search the application management DB 5005 (FIG. 8A) to read out the corresponding application URL of "https://daas.com/cm_upload.jnlp" to identify a program corresponding to the application ID Similarly, the writing-reading processing unit 59 uses the service ID of "Tag_CmRecord" corresponding to the intermediary terminal ID of "Eg001-01" as a search key to read out the application URL of "https://daas.com/cm_recordjnlp" to identify a program corresponding to the application ID.

Then, the transmission-reception unit 51 transmits the service list to the transmission-reception unit 31 of the intermediary terminal 3, and then the transmission-reception unit 31 transmits the service list to the image capturing device control unit 34 (step S7). At this stage, the service content indicated by the service list includes, for example, java network launching protocol (JNLP) file, which is an example of an application program used for receiving a service at the intermediary terminal 3, service ID, and application ID.

Then, the image capturing device control unit 34 executes the received JNLP file of "https:// . . . .com/cm_upload.jnlp" to implement the upload execution unit 42 (step S8).

Similarly, the image capturing device control unit 34 executes the received JNLP file of "https:// . . . .com/cm_record.jnlp" to implement the recording execution unit 43 (step S9). Since the application ID is associated with the service ID in the service content, the program corresponding to the application ID can be determined as a specific program associated with a specific service.

With this processing, even if the image capturing device 1 is not yet connected to the intermediary terminal 3, the intermediary terminal 3 can receive the program used for implementing a service using the image capturing device 1 from the service management server 5 and execute the program in advance.

Then, the main control unit 33 uses for example, simple network management protocol (SNMP) to search the browser control unit 35 used for acquiring the browser ID (step S10)

Then, the main control unit 33 acquires the browser ID identifying the browser unit 41, which is a target controlled by the browser control unit 35, from the browser control unit 35 (step S11).

In the above described configuration, the main control unit 33 and the browser control unit 35 are provided within the intermediary terminal 3. In this configuration, if the main control unit 33 included in one intermediary terminal 3 communicates with the other browser unit included in other intermediary terminal via the same network, the main control unit 33 included in one intermediary terminal 3 uses the simple network management protocol (SNMP) to search the one or more browser control units 35 disposed on the same network so that a plurality of the browser control units and the browser units can be utilized. Therefore, the searching of the browser control unit 35 is not necessarily required, but the acquiring destination (browser control unit 35) that the main control unit 33 is to acquire the browser ID can be pre-set in advance.

Then, under an instruction from the main control unit 33, the transmission-reception unit 31 transmits, to the transmission-reception unit 51 of the service management server 5, a browser usable notification indicating that the browser unit corresponding to the acquired browser ID (e.g., the browser unit 41 of the intermediary terminal 3 in this case) becomes ready for use, and then the transmission-reception unit 51 transmits the browser usable notification to the writing-reading processing unit 59 (step S12). At this stage, the browser ID acquired by the main control unit 33 is also transmitted.

Then, the writing-reading processing unit 59 updates the browser state stored in the intermediary terminal state management DB 5003 from "not activated" to "activated" based on the acquired browser ID (step S13).

Subsequently, as illustrated in FIG. 12, the main control unit 33 designates the acquired browser ID and the initial access URL, and requests the browser control unit 35 to activate the browser unit 41 identified by the designated browser ID (step S21). The initial access URL indicates the URL to be accessed by the browser unit 41 at first, and is set to the browser control unit 35 in advance.

Then, in response to receiving the request from the main control unit 33, the browser control unit 35 activates the browser unit 41 identified by the browser ID using the KIOSK mode (step S22). At this stage, the browser control unit 35 inputs the initial access URL to the browser unit 41.

In response to the activation using the KIOSK mode in step S22, the browser unit 41 transmits a hypertext transfer protocol (HTTP) request to the transmission-reception unit 51, and then the transmission-reception unit 51 transmits the HTTP request to the determination unit 55 indicated by the initial access URL (step S23). At this stage, the browser ID identifying the browser unit 41, which is a sender or transmission source, is also transmitted to the determination unit 55.

Then, under the instruction of the determination unit 55, the transmission-reception unit 51 of the service management server 5 transmits a response (HTTP response) including a redirect request to the browser unit 41 of the intermediary terminal 3 (step S24).

The redirect request includes the URL of application (in this case, slide application URL) that is associated with the browser ID as the redirect destination. Further, the redirect request also includes the terminal URL and the browser ID included in the HTTP request as the notification information to the redirect destination. The terminal URL is the URL of the main control unit 33. Further, before performing step S24, the determination unit 55 refers to the service management DB 5002 and the application management DB 5005 to identify the URL of the application associated with the browser ID received in step S23.

Then, in accordance with the redirect request received in step S24, the browser unit 41 transmits (redirects) the HTTP request to the output application URL, which is the redirect destination, via the transmission-reception unit 51 and the writing-reading processing unit 59 (step S25). The HTTP request includes the terminal URL and the browser ID included in the redirect request.

Then, the writing-reading processing unit 59 sequentially searches the intermediary terminal state management DB

5003 and the application management DB 5005 using the browser ID as a search key to read out the corresponding script and display data (step S26).

For example, if the intermediary terminal ID of the intermediary terminal 3 is "Eg001-01" and the browser ID is "KIOSK1," at first, the writing-reading processing unit 59 uses the browser ID of "KIOSK1" associated with the intermediary terminal ID of "EG001-01" as a search key to read out or retrieve the corresponding output application ID of "AP_Slide." Then, the writing-reading processing unit 59 uses the output application ID of "AP_Slide" as a search key for searching the application management DB (see FIG. 8A) to retrieve or read out a script file of "http:/ . . . .com/phtoshow.jp," which is an example of program stored in the corresponding application URL and display data of "http:// . . . .com/photoshow.html" from the application management DB. The script file of "http:// . . . .com/phtoshow.jp" is an example of a simple program causing the browser unit 41 to execute a connection to the communication URL included in the HTTP request. The display data of "http:// . . . .com/photoshow.html" is data causing the browser unit 41 to render an user interface, such as a frame for outputting document image data (e.g., slide show).

Then, as a response to the HTTP request received in step S25, the transmission-reception unit 51 transmits the script file and display data, acquired from the writing-reading processing unit 59, to the browser unit 41 (step S27). The script file and display data are one example of data indicating a request for executing the processing to the intermediary terminal 3. For example, the script can be another type of program, and the display data can be another type of data.

In response to receiving the response in step S27, the browser unit 41 executes the script file included in the response to establish a communication path between the main control unit 33 identified by the terminal URL (step S28). The communication path is used as a communication path for transmitting the notification, received by the main control unit 33 from the service management server 5, to the browser unit 41. The communication path can use, for example, websocket.

Then, the browser unit 41 generates or renders screen image data (hereinafter, "display screen") on a pre-set region of the RAM 303 (e.g., video memory) based on the display data included in the response (step S29). For example, the display screen is a screen that serves as a frame screen, which is used to set document image data distributed from the service management server 5. The rendering content (i.e., display screen) generated by the browser unit 41 is output to the display 9 via an interface such as high-definition multimedia interface (HDMI: registered trademark), and then the rendering content (i.e., display screen) can be output (displayed) using the display 9.

As a result, the pre-processing that is performed for preparing each service is completed.

(Acquiring of Information of Image Capturing Device)

Figure 13:
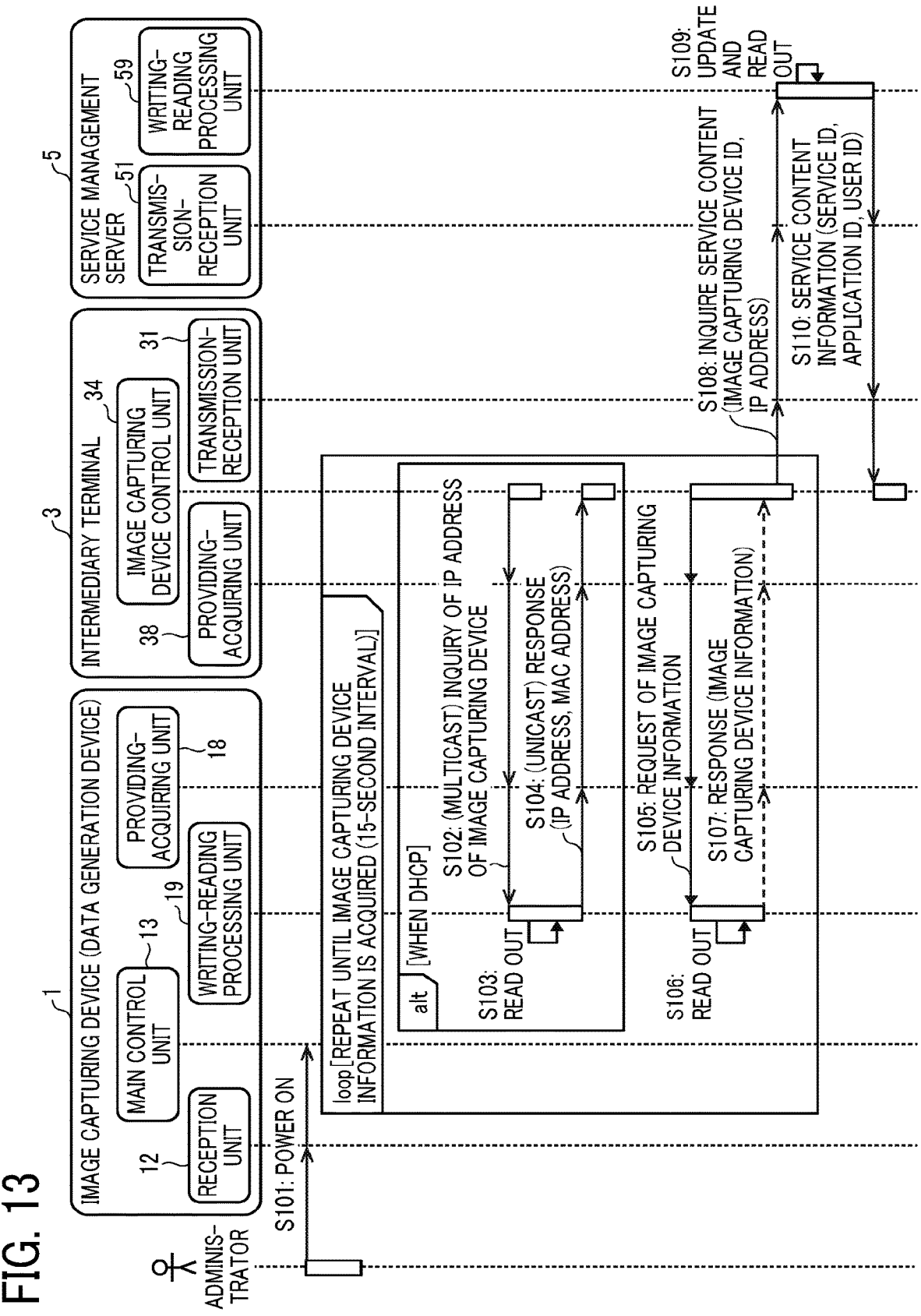
FIG. 13 is a sequence diagram illustrating a process performed by an intermediary terminal for acquiring image capturing device information from an image capturing device and providing the image capturing device information to a service management server according to an embodiment of this disclosure.

Hereinafter, a description is given of processing for acquiring the image capturing device information with reference to FIG. 13. FIG. 13 is a sequence diagram illustrating a process performed by the intermediary terminal 3 for acquiring the image capturing device information from the image capturing device 1 and providing the image capturing device information to the service management server 5.

At first, when the reception unit 12 of the image capturing device 1 receives a notification indicating that the image capturing device 1 is turned on by supplying power under an instruction of an administrator at the client C side, the reception unit 12 activates the main control unit 13 (step S101). Then, the intermediary terminal 3 repeats the processing of steps S102 to S107 to be described later with a pre-set time interval (e.g., 15-second interval) until the intermediary terminal 3 acquires the image capturing device information from the image capturing device 1. The intermediary terminal 3 determines whether the IP address of the image capturing device to be searched by the intermediary terminal 3 is a fixed IP address or a dynamic IP address (DHCP) using the image capturing device information management DB 5001, and performs a searching corresponding to the fixed or dynamic setting. The multicast domain name system (mDNS) function can be used as a method for making the simple searching.

For example, when the IP address of the image capturing device is the dynamic IP address (DHCP), the following processing of steps S102 to S104 is performed.

Specifically, under the instruction of the image capturing device control unit 34, the providing-acquiring unit 38 of the intermediary terminal 3 transmits, to the providing-acquiring unit 18 of the image capturing device 1 existing in the same subnet, an inquiry of the IP address of the image capturing device 1 in the same subnet using a multicast address (step S102).

Then, the writing-reading processing unit 19 of the image capturing device 1 reads out the IP address of the image capturing device 1 (own device) in accordance with the inquiry received from the providing-acquiring unit 18 (step S103).

Then, the providing-acquiring unit 18 transmits the IP address, acquired from the writing-reading processing unit 19, to the providing-acquiring unit 38 of the intermediary terminal 3 using an unicast, and then the providing-acquiring unit 38 transmits the acquired IP address to the image capturing device control unit 34 (step S104). At this stage, the MAC address is also transmitted to the image capturing device control unit 34.

Then, if the IP address of the image capturing device 1 is the fixed IP address, or if the IP address of the image capturing device 1 is the dynamic IP address (DHCP) and the processing of steps S102 to S104 is performed, under the instruction of the image capturing device control unit 34, the providing-acquiring unit 38 transmits a request of the image capturing device information to the providing-acquiring unit 18 of the image capturing device 1, and then the providing-acquiring unit 18 transmits the request to the writing-reading processing unit 19 (step S105).

Then, the writing-reading processing unit 19 reads out the image capturing device information of the image capturing device 1 (own device) from the storage unit 1000 (step S106).

Then, as a response to the request received in step S105, the providing-acquiring unit 18 transmits the response including the image capturing device information, read out by the writing-reading processing unit 19, to the providing-acquiring unit 38 of the intermediary terminal 3, and then the providing-acquiring unit 38 transmits the response to the image capturing device control unit 34 (step S107). The image capturing device information includes various information, such as user ID, manufacturer name, type number, serial number, Wi-Fi MAC address, and firmware version.

Then, under the instruction of the image capturing device control unit 34, the transmission-reception unit 31 of the intermediary terminal 3 transmits the image capturing device information to the transmission-reception unit 51 of the service management server 5, and then the transmission-reception unit 51 transmits the image capturing apparatus information to the writing-reading processing unit 59 (step S108). At this stage, the image capturing device ID and the IP address of the image capturing device 1 are also transmitted from the transmission-reception unit 31 to the transmission-reception unit 51.

Then, in the service management server 5, the writing-reading processing unit 59 registers the IP address in a recording portion of the image capturing device ID of the image capturing device 1 in the image capturing device information management DB 5001 based on the acquired image capturing device information, and then updates the connection state between the image capturing device 1 and the intermediary terminal 3 from "not connected" to "connected" (step S109).

Then, the writing-reading processing unit 59 refers to the DBs of FIGS. 6, 7, and 8 to identify the service content information indicating the service content that is registered in association with the image capturing device ID transmitted in step S108, and then under the instruction of the writing-reading processing unit 59, the transmission-reception unit 51 of the service management server 5 transmits the service content information indicating the service content to the transmission-reception unit 31 of the intermediary terminal 3, and then the transmission-reception unit 31 transmits, to the image capturing device control unit 34, the service content information set for the image capturing device 1 by performing the pre-registration processing of FIG. 9 (step S110).

The service ID registered in association with the image capturing device ID can be identified by searching the image capturing device information management DB 5001 illustrated in FIG. 6A.

Further, the application ID associated with the identified service ID can be identified by searching the image capturing device information management DB 5001 illustrated in FIG. 6B.

Further, the application storage location (URL), the application type, and the information of corresponding browser and corresponding apparatus corresponding to the identified application ID can be identified by searching the application management DB 5005 illustrated in FIG. 8A.

The service content information includes the service ID identifying the service associated with the image capturing device 1, identified as above described, the application ID identifying the application to be executed to implement the service, the application type, and the information of corresponding browser and corresponding apparatus.

Further, the program to be identified by the application URL associated with the application ID in the application management table of FIG. 8A, which is managed or controlled by the service management server 5, can be transmitted to the intermediary terminal 3 at this timing. In this case, when the intermediary terminal 3 receives the program from the service management server 5 and executes the received program, the application associated with the service ID becomes a state that the application can be executed.

Further, as above described with reference to FIGS. 11 and 12, the program corresponding to the application ID, such as JNLP file and script file, can be installed on the intermediary terminal 3 in advance. In this case, the service ID, the application ID, and the user ID included in the service content information are transmitted from the transmission-reception unit 51 to the transmission-reception unit 31. The service ID, the application ID, and the user ID represent the data that is managed or controlled using recorded data when the IP address is registered in step S109.

Further, if the service content is recording and uploading (if the service ID is "Tag_CmRecord"), the service content includes the recording start time and recording end time (see FIGS. 9B and 7B) and the setting content of the upload start time of the recorded file data, and the service content can be identified by searching the recording management DB 5004 (FIG. 7B) using the image capturing device ID transmitted in step S108 as a search key.

(Uploading of Still Image File and Slide Show)

Figure 14A:
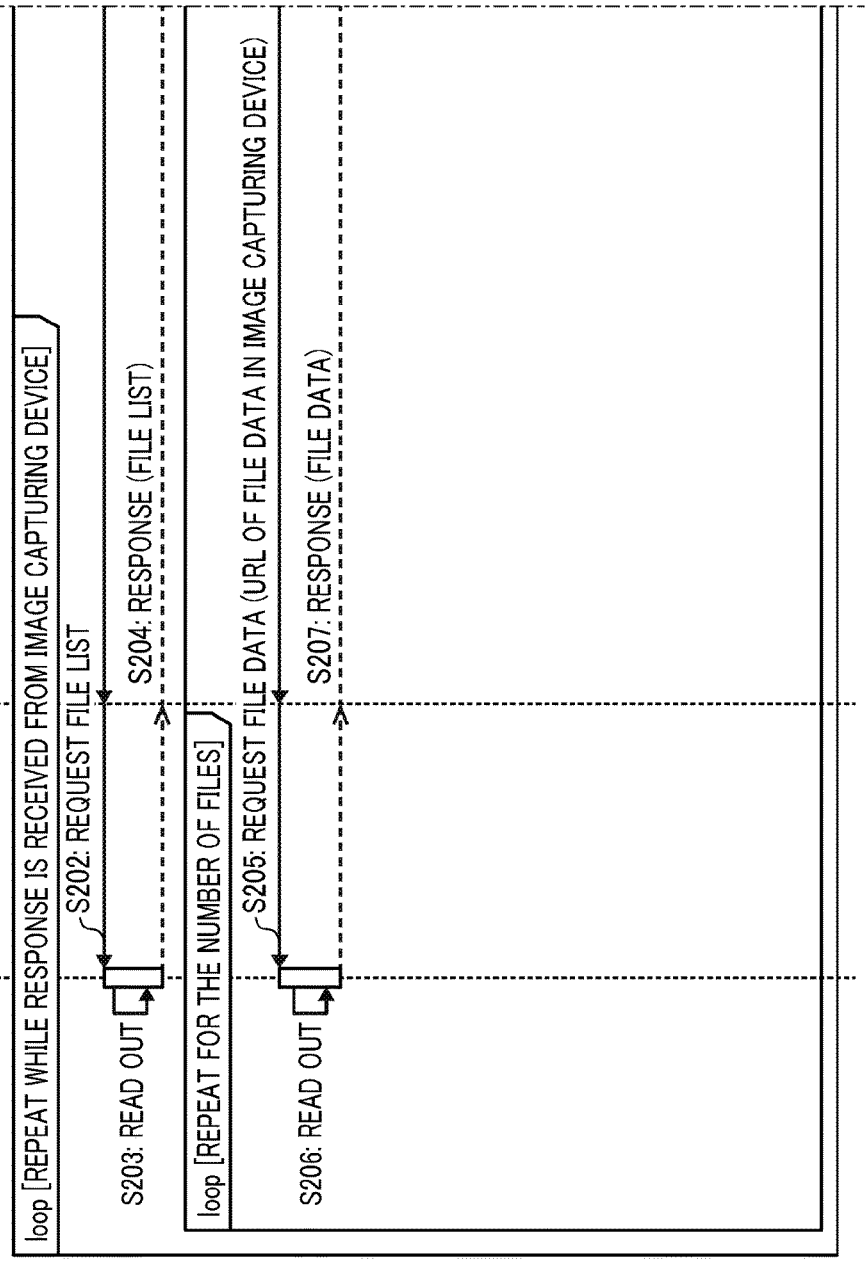

Hereinafter, a description is given of a process of executing the uploading of still image file and slide show service of the still image file (corresponding to "slide show service" in FIG. 9B) with reference to FIG. 14. FIGS. 14A and 14B (FIG. 14) are sequence diagrams illustrating a process of uploading the still image file and performing a service of slide show of the still image file.

At first, when the image capturing device control unit 34 acquires the service content information in step S110 (FIG. 13), the image capturing device control unit 34 transmits a service start request to the upload execution unit 42 (step S201). Specifically, the image capturing device control unit 34 transmits the service start request to the application associated with the service ID included in the acquired service content information. The application associated with the service ID can be identified using the application ID included in the acquired service content information. Since the service content identified by the service ID of "Tag_CmSlide1" indicates the uploading of the still image and slide show of still image (see FIG. 10B), the image capturing device control unit 34 transmits the service start request to the upload execution unit 42 identified by the application ID of "AP_EgCmUpload" of the input application associated with the service ID of "Tag_CmSlide1." At this stage, the image capturing device ID acquired in step S107 (FIG. 13) is also transmitted.

Then, the upload execution unit 42 of the intermediary terminal 3 requests a file list of image data to the image capturing device 1, and repeats the processing of steps S202 to S215, to be described below, while the response is being received from the image capturing device 1.

Specifically, under the instruction of the upload execution unit 42, the providing-acquiring unit 38 transmits a request for a file list of image data to the providing-acquiring unit 18 of the image capturing device 1, and then the providing-acquiring unit 18 transmits the request to the writing-reading processing unit 19 (step S202).

Then, the writing-reading processing unit 19 reads out the file list (step S203).

Then, as a response to the request received in step S202, the providing-acquiring unit 18 transmits the response including the file list, read-out by the writing-reading processing unit 19, to the providing-acquiring unit 38 of the intermediary terminal 3, and then the providing-acquiring unit 38 transmits the response to the upload execution unit 42 (step S204). The file list includes the URL of each file data in the image capturing device 1.

Then, the intermediary terminal 3 repeats the uploading and slide show, corresponding to steps S205 to S215, for the number of files included in the file list to the service management server 5 (and the image capturing device 1).

Specifically, under the instruction of the upload execution unit 42, the providing-acquiring unit 38 transmits a request of file data, such as image data, to the providing-acquiring unit 18 of the image capturing device 1, and then the providing-acquiring unit 18 transmits the request to the writing-reading processing unit 19 (step S205). At this stage, the URL of the file data in the image capturing device 1 is also transmitted.

Then, the writing-reading processing unit 19 reads out the file data from the URL of the file data (step S206).

Then, as a response to the request received in step S205, the providing-acquiring unit 18 transmits the response including the file data, read out by the writing-reading processing unit 19, to the providing-acquiring unit 38 of the intermediary terminal 3, and then the providing-acquiring unit 38 transmits the response to the upload execution unit 42 (step S207).

Then, under the instruction of the upload execution unit 42, the transmission-reception unit 31 of the intermediary terminal 3 transmits the file data to the transmission-reception unit 51 of the service management server 5, and then the transmission-reception unit 51 transmits or uploads the file data to the writing-reading processing unit 59 (step S208). At this stage, the user ID identifying the user of the image capturing device 1 is also transmitted from the transmission-reception unit 31 to the transmission-reception unit 51. This user ID is included in the image capturing device information transmitted in step S107 (FIG. 13) described above.

Then, in the service management server 5, the writing-reading processing unit 59 associates the acquired file data and the user ID, and stores the associated file data and user ID for each contract ID in the file management DB 5006 (step S209).

Further, the upload execution unit 42 instructs the writing-reading processing unit 39 to perform the storing process, and the URL of the file data received in step S207 to be used for performing the slide show display (step S210).

Then, the writing-reading processing unit 39 stores the file data in the designated URL in the storage unit 3000 (step S211).

Further, since the service content information acquired in step S110 (FIG. 13) includes the output application ID of "AP_Slide" associated with the service ID of "Tag_CmSlide1," the upload execution unit 42 transmits a request of starting service, such as the slide show service, to the main control unit 33, and then the main control unit 33 transmits the start request of service to the browser unit 41 that executes the program corresponding to the output application ID of "AP_Slide" (step S212). Whether or not the output application ID of "AP_Slide" is to be executed by the browser can be determined based on the information of corresponding browser and/or corresponding apparatus included in the service content information. At this stage, the service ID, the browser ID, and the URL of file data in the intermediary terminal 3 designated in step S210 are also transmitted to the browser unit 41.

Then, the main control unit 33 transmits the start request of slide show service to the browser unit 41 identified by the browser ID acquired in step S212 (step S213). At this stage, the URL of the file data in the intermediary terminal 3 is also transmitted to the browser unit 41.

Then, the browser unit 41 transmits a request of file data, which is a target of slide show service, to the writing-reading processing unit 39 (step S214). At this stage, the URL of the file data in the intermediary terminal 3 acquired in step S213 is also transmitted to the writing-reading processing unit 39.

Then, the writing-reading processing unit 39 reads out the file data from the designated URL in the storage unit 3000 (step S215).

Then, as a response to the request received in step S214, the writing-reading processing unit 39 transmits the response including the read-out file data to the browser unit 41 (step S216).

Then, the browser unit 41 performs the slide show display using the display 9 by playing the file data acquired in step S216 (step S217).

Then, the uploading of still image file and the processing of slide show of still image file ends or terminates. Further, if the service content indicates that the service of uploading the still image file is performed without performing the service of the slide show of still image file (i.e., if the upload service is checked but the slide show service is not checked in FIG. 9B) as indicated in FIG. 10A, the processing in steps S210 to S217 are not performed.

In an example case of the service illustrated in FIG. 14, the intermediary terminal 3 can control the image capturing device 1 without a user operation to the image capturing device 1, but not limited thereto. For example, a user can use a user terminal to register an image capturing device control service that controls the image capturing device 1 in the service management server 5 in association with the image capturing device 1.

In this case, for example, the user terminal acquires the corresponding service ID and transmits the corresponding service ID to the service management server 5, and then the service management server 5 can search the image capturing device information management DB 5001 (FIG. 6A) to identify the intermediary terminal ID and the image capturing device ID (i.e., image capturing device of control target), which are associated with the service ID received by the service management server 5.

Further, whether the image capturing device 1 (i.e., control target) associated with the service ID is connected or not with the corresponding intermediary terminal 3 can be determined by searching the image capturing device information management DB 5001 (FIG. 6A).

If it is determined that the image capturing device 1 (i.e., control target) is connected to the intermediary terminal 3, the service management server 5 transmits, to the user terminal, a notice that the image capturing device 1 (i.e., control target) is connected to the intermediary terminal 3, and further transmits, to the user terminal, the program used for transmitting a specific instruction (e.g., start of image capturing) to the image capturing device 1 associated with the acquired service ID, and then user terminal can transmit, to the image capturing device 1, an instruction used for controlling the image capturing device 1 associated with the acquired service ID, via the service management server 5 and the intermediary terminal 3.

The user terminal executes the program received from the service management server 5 to display a user interface (UI) screen used for transmitting the instruction, such as a start instruction of image capturing. When the user performs an operation on the UI screen, the user can transmit the instruction, such as the start instruction of image capturing, to the service management server 5. When the service management server 5 receives the instruction, such as the start instruction of image capturing, the service management server 5 transmits to the intermediary terminal 3 corresponding to the identified intermediary terminal ID, the instruction, such as the start instruction of image capturing, with the image capturing device ID.

Further, when the intermediary terminal 3 receives the instruction, such as the start instruction of image capturing, and the image capturing device ID, the intermediary terminal 3 transmits the instruction, such as the start instruction of image capturing, to the image capturing device 1 corresponding to the image capturing device ID, among the image capturing devices connected to the intermediary terminal 3.

Further, the image capturing device 1, which has received the instruction, such as the start instruction of image capturing, controls an operation, such as an image capturing operation, based on the received instruction.

Further, as to the image capturing device information management DB 5001 of FIG. 6A, managed or controlled by the service management server 5, a plurality of image capturing device IDs can be associated with the same service ID in some cases. In such cases, the plurality of image capturing device IDs identified as candidates of the control target can be transmitted to the user terminal, and then a specific image capturing device ID can be selected at the user terminal by the user, and the selected specific image capturing device ID can be transmitted to the service management server 5, and then the service management server 5 can identify the specific image capturing device ID corresponding to the control target image capturing device. Further, by transmitting the image capturing device ID acquired or input from the user terminal to the service management server 5 with the service ID, the service management server 5 can identify the specific image capturing device ID of the control target.

In step S201 of FIG. 14, the start request of uploading and slide show is transmitted to the upload execution unit 42.

Further, as to the image capturing device control service, the image capturing device control unit 34 transmits to an application, the instruction, such as the start instruction of image capturing, under the instruction (e.g., start instruction of image capturing) received from the service management server 5 as similar to step S201 of FIG. 14, and then the image capturing device control unit 34 executes the application to transmit the instruction (e.g., start instruction of image capturing) to the corresponding image capturing device 1 to control the image capturing device 1. Then, the file data obtained by the image capture operation performed by the image capturing device 1 can be uploaded and displayed using the slide show by performing the processing in steps S205 to S217 (FIG. 14) in the same manner. Whether or not the above described processing is performed for the service can be changed based on the setting content generated by combining the service ID and the application ID registered in the service management table of FIG. 6B.

Further, the user terminal can acquire the service ID using any method. For example, by capturing an image, such as quick response (QR) code image, using a camera or the like, a specific service ID embedded in the captured image can be acquired as the service ID, or a specific service ID included in information received by a communication suing a radio frequency identifier (RFID) tag or a beacon can be acquired. Further, the image information and the received information may include not only the service ID but also the image capturing device ID of the image capturing device 1, which is the control target.

(Uploading of Movie Image File)

If the service content indicates that a service of uploading of movie image file or a service of streaming of movie image file is to be performed (if the live distribution is checked in FIG. 9B) as indicated in FIG. 10D, the uploading can be performed using the processing in steps S201 to S209, and thereby the description thereof will be omitted.

Further, the live distribution of movie image file is performed by the streaming distribution in real time. The live distribution of movie image file can be performed using the processing in steps S210 to S217 (FIG. 14) and the same communication path, in which the slide show display is replaced with the streaming distribution, and thereby the description thereof will be omitted.

(Recording and Uploading)

Figure 15B:
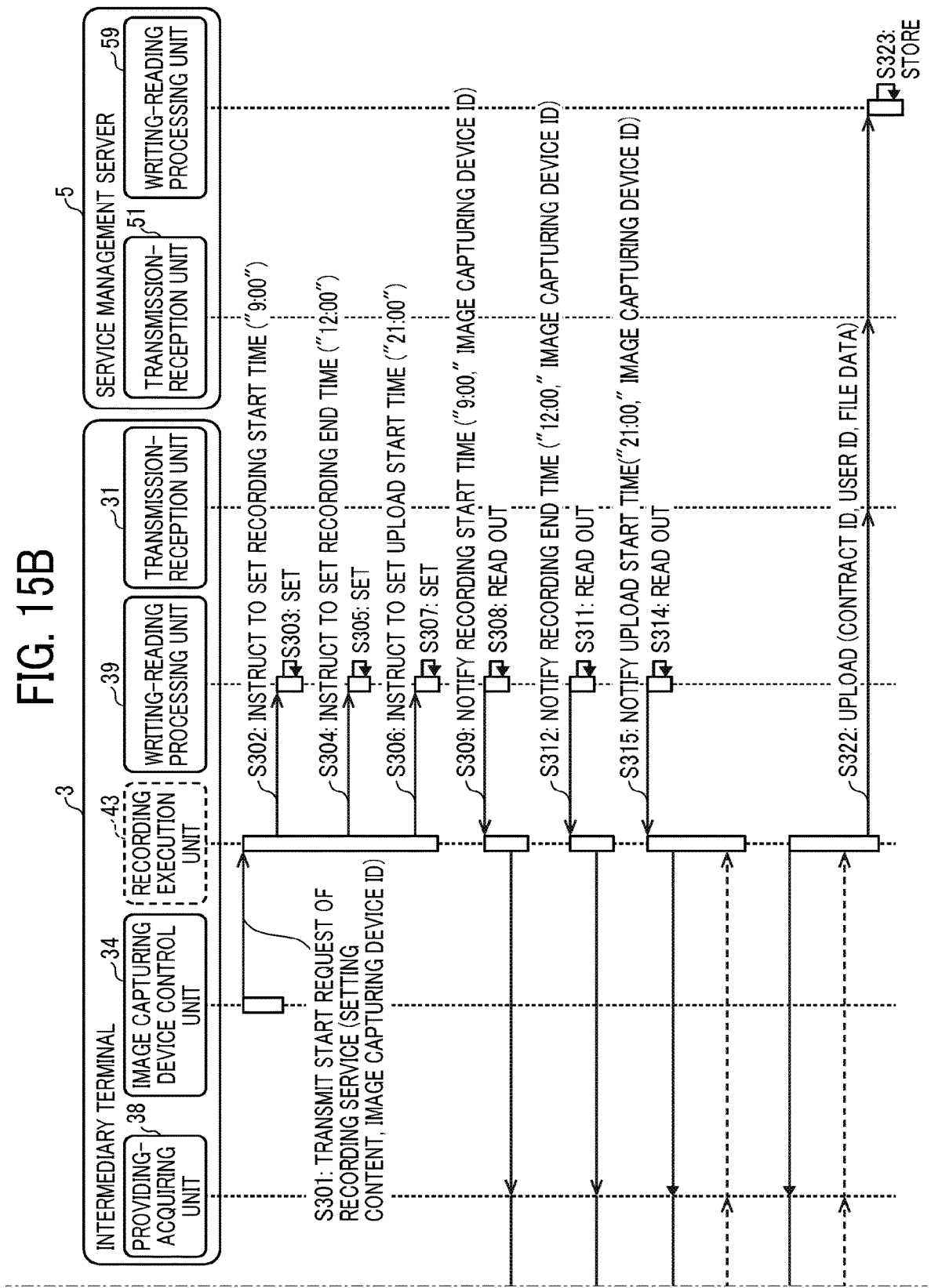

Hereinafter, a description is given of a process of executing a service of recording and uploading with reference to FIG. 15. FIGS. 15A and 15B (FIG. 15) are sequence diagrams illustrating a process of executing a service of recording and uploading, which corresponds to the "recording service" in FIG. 9B.

At first, if the image capturing device control unit 34 acquires the service content information including the service ID of "Tag_CmRecord" indicating the service of recording and uploading in step S110 (FIG. 13), the image capturing device control unit 34 transmits a service start request to the recording execution unit 43, which is an application identified by the input application ID of "AP_EgCmRecord" associated with the service ID of "Tag_CmRecord" included in the acquired service content information (step S301). The service content indicates the recording and uploading (see FIG. 10C). At this stage, the setting content of recording acquired in step S107 (e.g., recording start and end time, upload start time) and the image capturing device ID are also transmitted to the recording execution unit 43.

Then, the recording execution unit 43 instructs the writing-reading processing unit 39 to set based on the setting content acquired in step S301 (step S302).

Then, the writing-reading processing unit 39 sets the recording start time in the storage unit 3000 (step S303). In this example case, "9:00" is set as the recording start time.

Similarly, the recording execution unit 43 instructs the writing-reading processing unit 39 to set the recording end time based on the setting content acquired in step S301 (step S304).

Then, the writing-reading processing unit 39 sets the recording end time in the storage unit 3000 (step S305). In this example case, "12:00" is set as the recording end time.

Similarly, the recording execution unit 43 instructs the writing-reading processing unit 39 to set the upload start time of the recorded file data based on the setting content acquired in step S301 (step S306).

Then, the writing-reading processing unit 39 sets the upload start time in the storage unit 3000 (step S307). In this example case, "21:00" is set as the upload start time.

Then, the writing-reading processing unit 39 reads out the recording start time from the storage unit 3000 (step S308).

Then, the writing-reading processing unit 39 notifies the recording start time to the recording execution unit 43 (step S309).

Then, under the instruction of the recording execution unit 43, the providing-acquiring unit 38 of the intermediary terminal 3 transmits a request for starting a recording operation to the providing-acquiring unit 18 of the image capturing device 1, and then the capturing unit 16 starts of the image capturing device 1 an image capturing operation (step S310).

Then, the writing-reading processing unit 39 reads out the recording end time from the storage unit 3000 (step S311).

Then, the writing-reading processing unit 39 notifies the recording end time to the recording execution unit 43 (step S312).

Then, under the instruction of the recording execution unit 43, the providing-acquiring unit 38 of the intermediary terminal 3 transmits the recording end request to the providing-acquiring unit 18 of the image capturing device 1, and then the capturing unit 16 of the image capturing device 1 ends or terminates the image capturing operation (step S313).

Then, the writing-reading processing unit 39 reads out the upload start time from the storage unit 3000 (step S314).

Then, the writing-reading processing unit 39 notifies the upload start time to the recording execution unit 43 (step S315).

Then, under the instruction of the recording execution unit 43, the providing-acquiring unit 38 of the intermediary terminal 3 transmits a request for starting the uploading to the providing-acquiring unit 18 of the image capturing device 1, and then the providing-acquiring unit 18 transmit the request to the writing-reading processing unit 19 (step S316).

Then, the writing-reading processing unit 19 reads out a file list, which is a upload target, from the storage unit 1000 (step S317).

Then, as a response to the request received in step S316, the providing-acquiring unit 18 transmits the response including the file list, read out by the writing-reading processing unit 19, to the providing-acquiring unit 38 of the intermediary terminal 3, and then the providing-acquiring unit 38 transmits the response to the recording execution unit 43 (step S318). The file list includes the URL of each file data stored in the image capturing device 1.

Then, under the instruction of the recording execution unit 43, the providing-acquiring unit 38 transmits a request of file data, such as image data, to the providing-acquiring unit 18 of the image capturing device 1, and then the providing-acquiring unit 18 transmits the request to the writing-reading processing unit 19 (step S319). At this stage, the URL of the file data stored in the image capturing device 1 is also transmitted to the writing-reading processing unit 19.

Then, the writing-reading processing unit 19 reads out the file data from the URL of the file data (step S320).

Then, as a response to the request received in step S319, the providing-acquiring unit 18 transmits the response including the file data, read out by the writing-reading processing unit 19, to the providing-acquiring unit 38 of the intermediary terminal 3, and then the providing-acquiring unit 38 transmits the response to the recording execution unit 43 (step S321).

Then, under the instruction of the recording execution unit 43, the transmission-reception unit 31 of the intermediary terminal 3 transmits or uploads the file data acquired from the image capturing device 1 to the transmission-reception unit 51 of the service management server 5, and then the transmission-reception unit 51 transmits the file data to the writing-reading processing unit 59 (step S322). At this stage, the contract ID identifying the contract using the image capturing device 1 and the user ID identifying the user of the image capturing device 1 are also transmitted from the transmission-reception unit 31 to the transmission-reception unit 51.

Then, the writing-reading processing unit 59 stores the contract ID, the user ID and the file data (file name) in the file management DB 5006 in association with each other (step S323).

As a result, the recording and upload processing ends or terminates. In this case, as illustrated in FIG. 10D, the intermediary terminal 3 can perform the streaming distribution of the file data. The streaming distribution can be performed using the processing in steps S210 to S217 (FIG. 14) and the same communication path, in which the slide show display is replaced with the streaming distribution, and thereby the description thereof will be omitted.

As to the above described embodiment, even if the image capturing device 1 cannot communicate directly with the service management server 5 via the communication network such as the Internet, the intermediary terminal 3 intermediates the communication between the image capturing device 1 and the service management server 5, with which the intermediary terminal 3 can control operations of the image capturing device 1, such as uploading the file data stored in the image capturing device 1 to the service management server 5 (e.g., steps S208, S322) in place of the image capturing device 1.

Further, even if the image capturing device 1 is unable to install the applications, which can be install on personal computers easily, the intermediary terminal 3 can download various applications from the service management server 5 according to the service content (steps S7 to S9), so that the intermediary terminal 3 can control operations of the image capturing device 1, such as uploading the file data stored in the image capturing device 1 (e.g., steps S208, S322) in place of the image capturing device 1.

Further, if the image capturing device 1 does not have an operation screen due to a device size restriction for prioritizing the user portability of the image capturing device 1, and thereby the user is difficult to perform the operation and confirmation on the image capturing device 1, the administrator can register the to-be-used service using the administrator terminal 7 to the service management server 5 in advance, and thereafter, the intermediary terminal 3 can perform the processing for receiving the registered services in place of the image capturing device 1.

Specifically, when the user turn on the power supply to the intermediary terminal 3 (step S1 in FIG. 11), the intermediary terminal 3 can automatically transmit the image capturing device ID of the image capturing device 1 to the service management server 5, and download the application used for the uploading service from the service management server 5 (step S7 in FIG. 11) so that the user of the image capturing device 1 can easily perform the service (steps S8 and S9 in FIG. 11) even if the user of the image capturing device 1 does not know how to download the application from the service management server 5.

Further, since the intermediary terminal 3 is requesting the image capturing device information, such as the image capturing device ID, to the image capturing device 1 periodically (step S105 in FIG. 13), the intermediary terminal 3 can acquire the service content information indicating the service content to be used for the image capturing device 1 (step S110 in FIG. 13) based on acquiring the image capturing device information acquired from the image capturing device 1.

As to the above described embodiment, various services using data generation devices (e.g., image capturing device), such as services using image data generated by the data generation device as the target data, can be provided easily, with which expandability of service can be improved.

In the above embodiment, the image capturing device 1 for capturing full-view spherical images is used, but is not limited thereto. For example, an image capturing device for capturing normal image may be employed.

The image capturing device 1 capturing images of objects and generating the still image data or movie image data is an example of an input device. However, the input device is not limited thereto. For example, the input device can be an audio collection device such as a microphone, which collects sound and generates sound or audio data. In this case, instead of recording the sound or audio data using the image capturing device 1, the sound or audio data is recorded by the audio collection device. The sound or audio data is an example of the input data (target data), and the input data (target data) includes image data generated by the image capturing device 1.

Further, the intermediary terminal 3 includes, for example, an audio collection device management unit instead of the image capturing device control unit 34. Further, the intermediary terminal 3 can download a recording application from the service management server 5 and generates a recording execution unit. The intermediary terminal 3 can acquire sound data from the audio collection device using the recording execution unit 43, and upload the audio data to the service management server 5.

Further, the display 9 is an example of an output device. The output device can include a speaker that outputs audio based on the audio sound data. When the input device is the audio collection device such as a microphone, a speaker can be used as the output device.

In the above described embodiment, the communication system is used in the educational fields, such as schools, but is not limited thereto. The communication system can be introduced to any organization, such as companies.

The functions of the above described embodiment can be implemented by circuitry and one or more processing circuits. The processing circuit includes one or more processors programmed to perform each function by software, such as a processor implemented by an electronic circuit, an application specific integrated circuit (ASIC), a digital signal processor (DSP), a field programmable gate array (FPGA), a system on chip (SOC), a graphics processing unit (GPU), a conventional circuit module, and the like designed to perform each of the functions described above.

Numerous additional modifications and variations are possible in light of the above teachings. It is therefore to be understood that, within the scope of the appended claims, the disclosure of this specification can be practiced otherwise than as specifically described herein. Any one of the above-described operations may be performed in various other ways, for example, in an order different from the one described above.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any storage medium for storing processor readable code such as a floppy disk, hard disk, CD ROM, magnetic tape device or solid state memory device. The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RANI may function as a physical memory or a primary memory of the apparatus, while the HDD may function as a secondary memory of the apparatus.

What is claimed is:

1. An intermediary terminal for mediating a communication between a data generator that generates target data, and a server that controls service content usable with the data generator, the intermediary terminal comprising:
   circuitry configured to
      acquire, from the data generator, device identification information identifying the data generator;
   transmit the acquired device identification information to the server via a communication network;
   transmit a request of a service list including service content associated with the intermediary terminal by a pre-registration processing to the server;
   receive, from the server, service content information indicating a service content associated with the device identification information, which is among the service list including the service content associated with the intermediary terminal; and
   execute processing on the target data input from the data generator in accordance with the service content associated with the device identification information indicated by the service content information,
   wherein the service content associated with the intermediary terminal includes one or more programs corresponding to an application to be executed to implement a service associated with the intermediary terminal.

2. The intermediary terminal according to claim 1, wherein the circuitry transmits terminal identification information identifying the intermediary terminal to the server via the communication network, receives the application, transmitted from the server based on the terminal identification information that the server has received, and executes the processing on the target data by activating the received application.

3. The intermediary terminal according to claim 2, wherein the circuitry acquires the target data from the data generator, and executes, as the processing on the target data, a process of uploading the acquired target data to the server.

4. The intermediary terminal according to claim 3, wherein the data generator is an image capturer and the target data is image data, and
wherein the intermediary terminal is installed with a browser used for performing a slide show of the acquired image data based on a start request of slide show.

5. The intermediary terminal according to claim 4, wherein the circuitry activates the browser to transmit a browser identification information identifying the browser to the server via the communication network, receives a slide show application transmitted from the server based on the browser identification information that the server has received, and activates the slide show application to perform the slide show.

6. The intermediary terminal according to claim 4, wherein the circuitry activates the browser to perform a live distribution of the image data.

7. The intermediary terminal according to claim 2, wherein when the data generator is an image capturer and the target data is image data, the circuitry controls settings of a recording start time.

8. The intermediary terminal according to claim 7, wherein the circuitry is further configured to transmit to the data generator, a request of starting a recording operation from the set recording start time.

9. The intermediary terminal according to claim 1, wherein the data generator indirectly communicates with the server via the communication network.

10. A communication system comprising:
a server that controls service contents usable with a data generator that generates target data; and
an intermediary terminal that mediates a communication between the data generator and the server,
wherein the server includes circuitry configured to transmit, to the intermediary terminal, service content information indicating a service content associated with device identification information identifying the data generator received from the intermediary terminal,
wherein the intermediary terminal includes another circuitry configured to
acquire, from the data generation device, the device identification information identifying the data generator,
transmit the acquired device identification information to the server via a communication network,
transmit a request of a service list including service content associated with the intermediary terminal by a pre-registration processing to the server;
receive, from the server, the service content information indicating the service content associated with the device identification information, which is among the service list including the service content associated with the intermediary terminal, and
execute processing on the target data input from the data generator in accordance with the service content associated with the device identification information indicated by the service content information,
wherein the service content associated with the intermediary terminal includes one or more programs corresponding to an application to be executed to implement a service associated with the intermediary terminal.

11. A method of controlling a communication between a data generator, which generates target data, and a server, which controls service content usable with the data generator, using an intermediary terminal, the method comprising:
acquiring, from the data generator, device identification information identifying the data generator;
transmitting the acquired device identification information to the server via a communication network;
transmitting a request of a service list including service content associated with the intermediary terminal by a pre-registration processing to the server;
receiving, from the server, service content information indicating a service content associated with the device identification information, which is among the service list including the service content associated with the intermediary terminal; and
executing processing on the target data input from the data generator in accordance with the service content associated with the device identification information indicated by the service content information,
wherein the service content associated with the intermediary terminal includes one or more programs corresponding to an application to be executed to implement a service associated with the intermediary terminal.

12. The method according to claim 11, further comprising:
transmitting terminal identification information identifying the intermediary terminal to the server via the communication network;
receiving the application, transmitted from the server based on the terminal identification information that the server has received; and
activating the received application for executing the processing on the target data.

13. The method according to claim 12, further comprising:
acquiring the target data from the data generator; and
executing, as the processing on the target data, a process of uploading the acquired target data to the server.

14. The method according to claim 13, wherein the data generator is an image capturer and the target data is image data, and
wherein the intermediary terminal is installed with a browser used for performing a slide show of the acquired image data based on a start request of slide show.

15. The method according to claim 14, wherein the browser transmits a browser identification information identifying the browser to the server via the communication network, receives a slide show application transmitted from the server based on the browser identification information that the server has received, and activates the slide show application to perform the slide show.

16. The method according to claim 14, wherein the browser performs a live distribution of the image data.

17. The method according to claim 12, further comprising:
when the data generator is an image capturer and the target data is image data, controlling settings of a recording start time.

18. The method according to claim 17, further comprising:
transmitting to the data generator, a request of starting a recording operation from the set recording start time.

19. The method according to claim 11, wherein the data generator indirectly communicates with the server via the communication network.

20. The intermediary terminal according to claim 1, wherein the service content further includes an Application ID identifying the application.

* * * * *